United States Patent
Sekiya et al.

(10) Patent No.: US 11,671,214 B2
(45) Date of Patent: Jun. 6, 2023

(54) WIRELESS COMMUNICATION APPARATUS, METHOD, AND WIRELESS COMMUNICATION SYSTEM

(71) Applicant: KABUSHIKI KAISHA TOSHIBA, Tokyo (JP)

(72) Inventors: Masahiro Sekiya, Inagi Tokyo (JP); Toshihisa Nabetani, Kawasaki Kanagawa (JP); Tatsuma Hirano, Kawasaki Kanagawa (JP); Toshio Ariga, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 141 days.

(21) Appl. No.: 17/016,919

(22) Filed: Sep. 10, 2020

(65) Prior Publication Data

US 2021/0226746 A1    Jul. 22, 2021

(30) Foreign Application Priority Data

Jan. 20, 2020   (JP) .............................. JP2020-007134

(51) Int. Cl.
*H04L 5/00* (2006.01)
*H04L 1/1607* (2023.01)
(Continued)

(52) U.S. Cl.
CPC ......... *H04L 5/0007* (2013.01); *H04B 7/0452* (2013.01); *H04B 7/0639* (2013.01); *H04L 1/0007* (2013.01); *H04L 1/1614* (2013.01)

(58) Field of Classification Search
CPC ... H04L 5/0007; H04L 1/0007; H04L 1/1614; H04L 1/1887; H04L 1/1685; H04B 7/0452; H04B 7/0639; H04B 7/024
See application file for complete search history.

(56) References Cited

U.S. PATENT DOCUMENTS

2009/0005104 A1   1/2009 Wang et al.
2015/0208431 A1   7/2015 Chen et al.
(Continued)

FOREIGN PATENT DOCUMENTS

CN   110691381 A   1/2020
JP   2009278557 A   11/2009
(Continued)

OTHER PUBLICATIONS

Part 11: Wireless LAN Medium Access Control (MAC) and Physical Layer (PHY) Specifications, IEEE Standard for Information technology—Telecommunications and information exchange between systems—Local and metropolitan area networks—Specific requirements, IEEE Std 802.11TM-2016, 2016, pp. 1-3532.

(Continued)

*Primary Examiner* — Sharmin Chowdhury
(74) *Attorney, Agent, or Firm* — Holtz, Holtz & Volek PC

(57) ABSTRACT

According to one embodiment, a wireless communication apparatus includes transmitter circuitry, receiver circuitry and processing circuitry. The processing circuitry is configured to determine, based on a first acknowledgement frame and a second acknowledgement frame, a first data frame received by a first wireless communication apparatus and not received by a second wireless communication apparatus among data frames. The processing circuitry is configured to determine that the transmitter circuitry transmits at least one of the first data frame and a second data frame to the second wireless communication apparatus, and the first wireless communication apparatus transmits the first data frame to the second wireless communication apparatus.

18 Claims, 20 Drawing Sheets

(51) Int. Cl.
*H04B 7/0452* (2017.01)
*H04B 7/06* (2006.01)
*H04L 1/00* (2006.01)

(56) References Cited

U.S. PATENT DOCUMENTS

| | | | |
|---|---|---|---|
| 2017/0063509 A1* | 3/2017 | Kim | H04L 1/1685 |
| 2019/0289495 A1* | 9/2019 | Chu | H04L 27/2602 |
| 2019/0297674 A1* | 9/2019 | Min | H04W 80/08 |
| 2020/0077441 A1 | 3/2020 | Madhavan et al. | |
| 2020/0119863 A1 | 4/2020 | Nakanishi et al. | |
| 2021/0127290 A1* | 4/2021 | Yang | H04W 72/0426 |
| 2021/0127441 A1 | 4/2021 | Hirano et al. | |
| 2021/0307099 A1* | 9/2021 | Ryu | H04L 1/08 |
| 2022/0039184 A1* | 2/2022 | Jia | H04W 80/02 |
| 2022/0070809 A1* | 3/2022 | Song | H04W 84/04 |

FOREIGN PATENT DOCUMENTS

| | | |
|---|---|---|
| JP | 5190114 B2 | 4/2013 |
| JP | 5366847 B2 | 12/2013 |
| JP | 5398585 B2 | 1/2014 |
| JP | 5867611 B2 | 2/2016 |
| JP | 6133578 B2 | 5/2017 |
| JP | 6308562 B2 | 3/2018 |
| JP | 2021069007 | 4/2021 |

OTHER PUBLICATIONS

U.S. Appl. No. 17/008,749, filed Sep. 1, 2020, First Named Inventor: Tatsuma Hirano, Title "Electronic Apparatus and Method".
Park, et al., "Multi-AP Transmission Procedure", IEEE 802.11-19/0048r0, Mar. 2019, 18 pages.
Ryu, et al., "Consideration on multi-AP coordination for EHT", IEEE 802.11-18/1982r0, Nov. 2018, 9 pages.

* cited by examiner

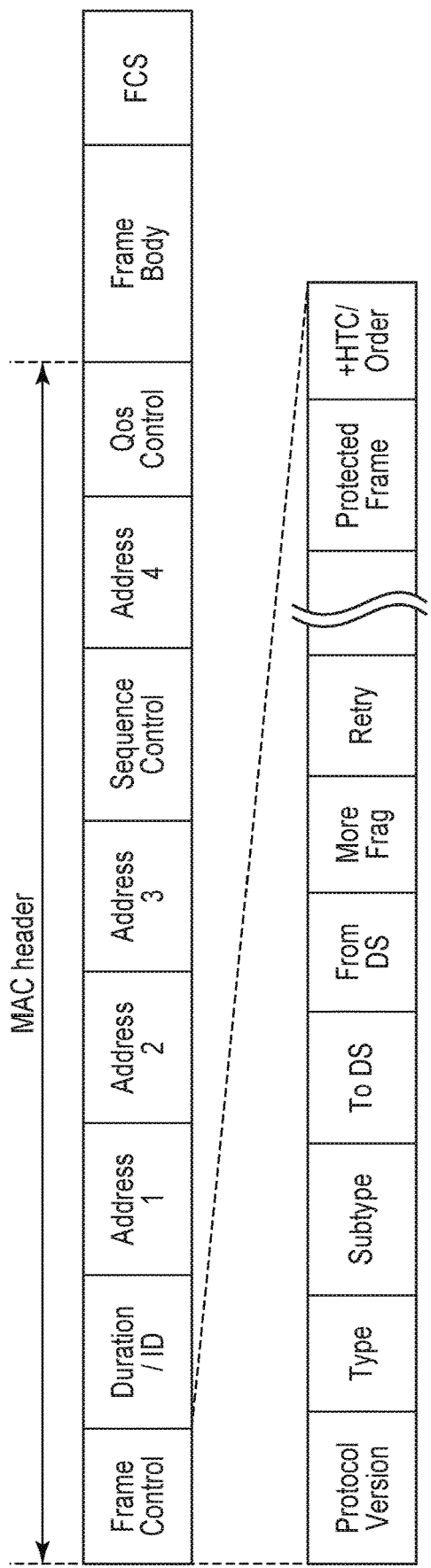
F I G. 3
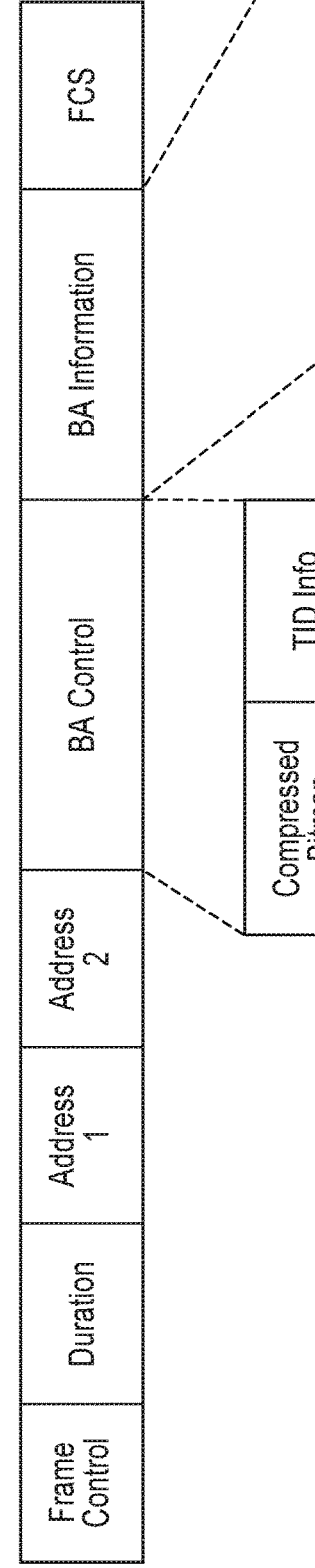
F I G. 4

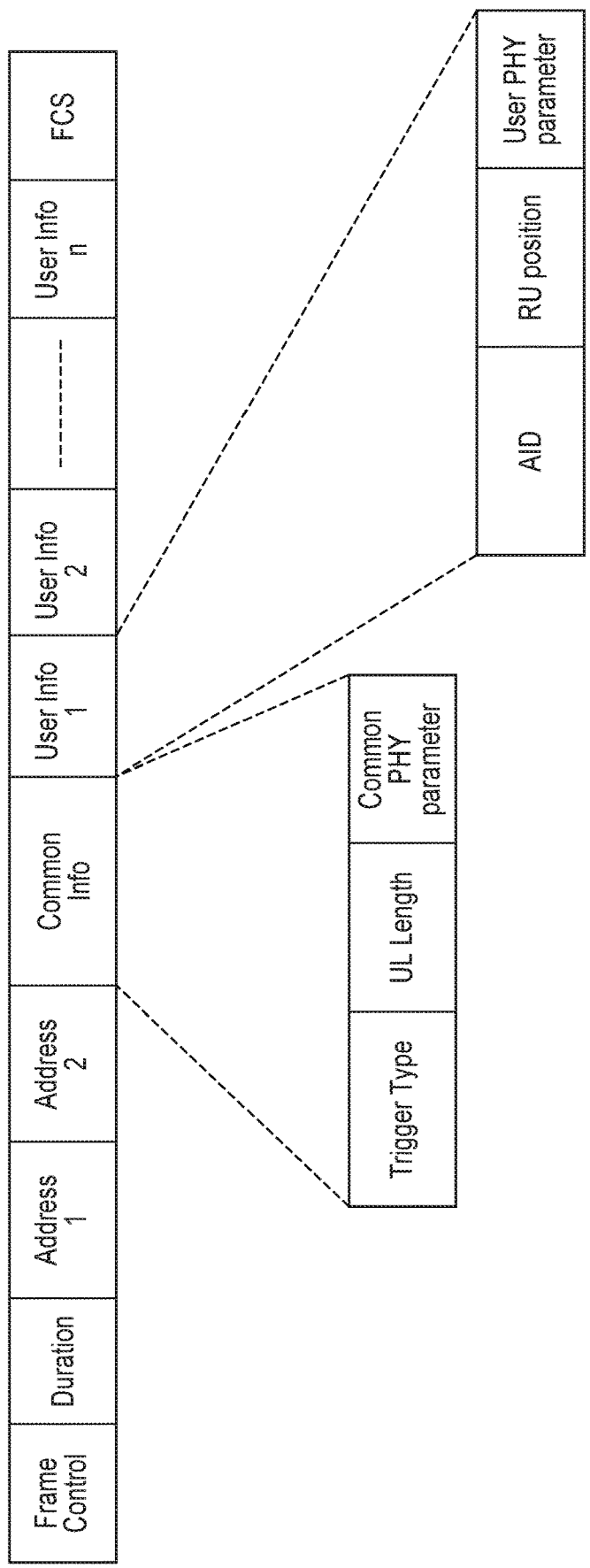
F I G. 5

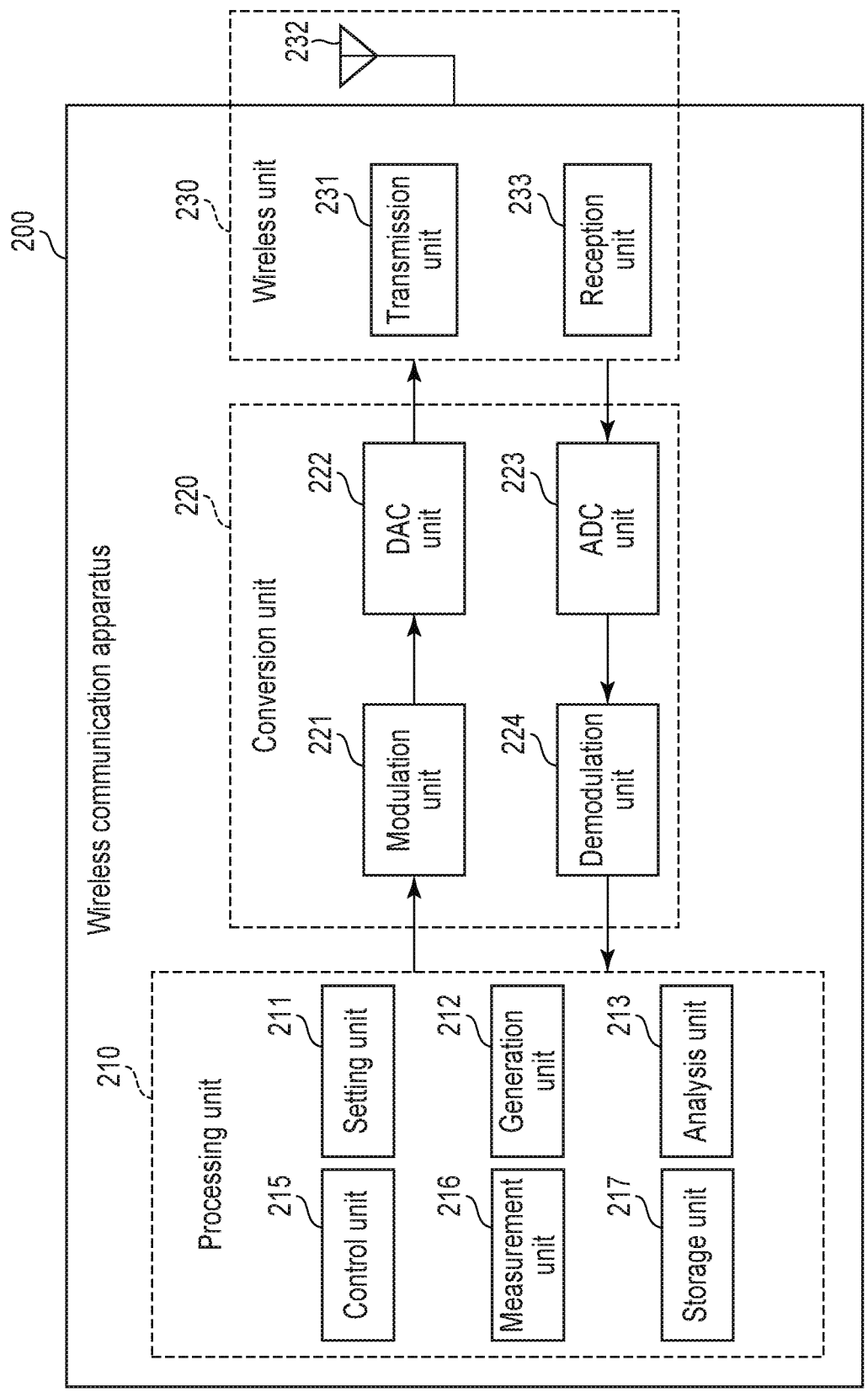
F I G. 7

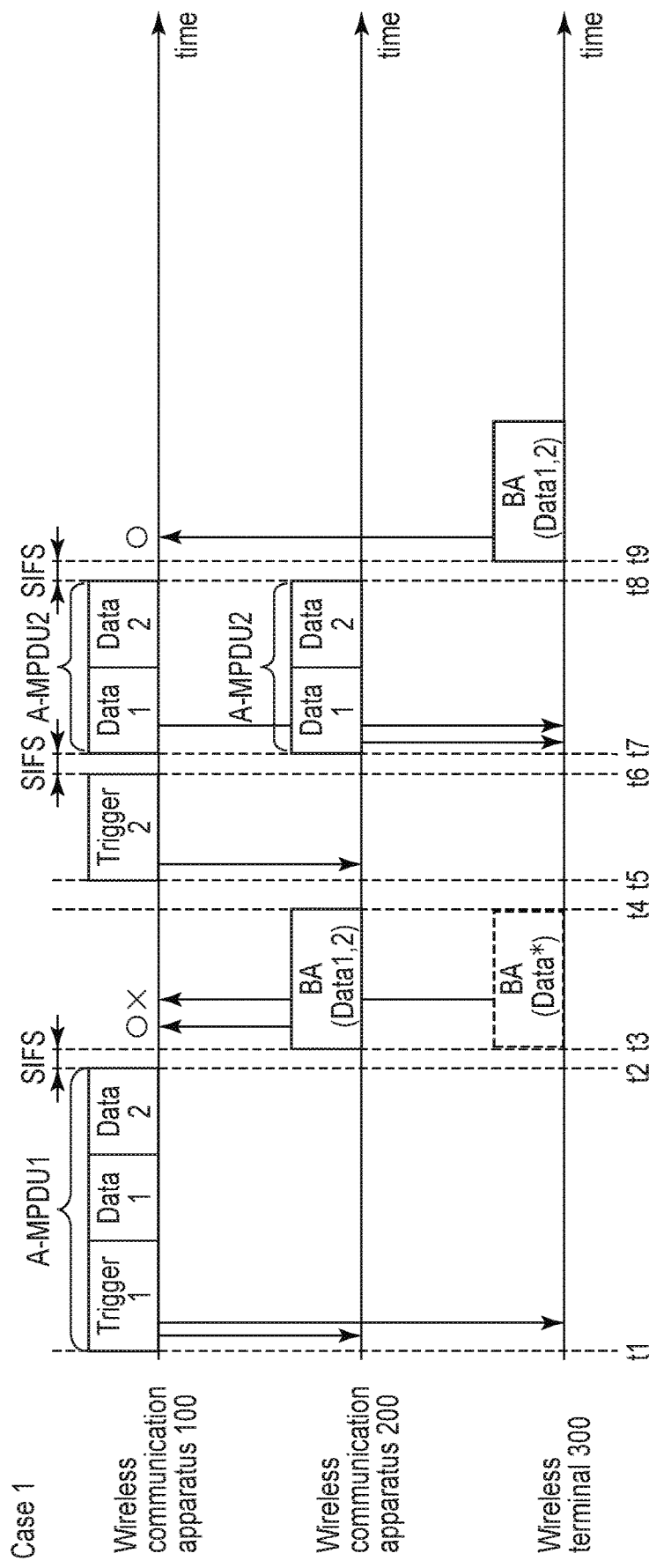
F I G. 8

| Delimiter | Trigger 1 (Group) | Delimiter | Data 1 (Wireless communication apparatus 200) | Delimiter | Data 2 (Wireless communication apparatus 200) | Delimiter | Data 1 (Wireless terminal 300) | Delimiter | Data 2 (Wireless terminal 300) |

F I G. 9

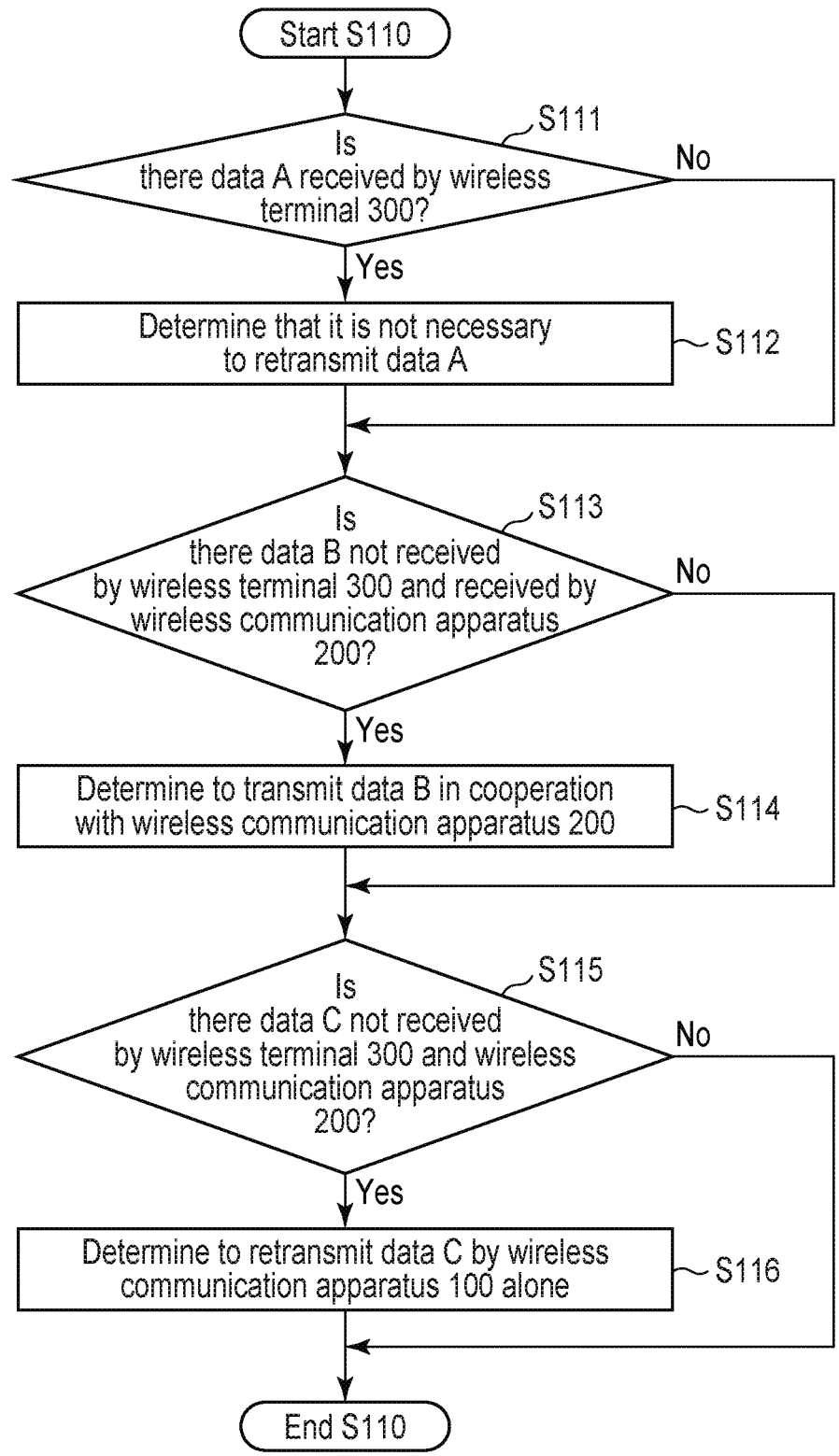
F I G. 11

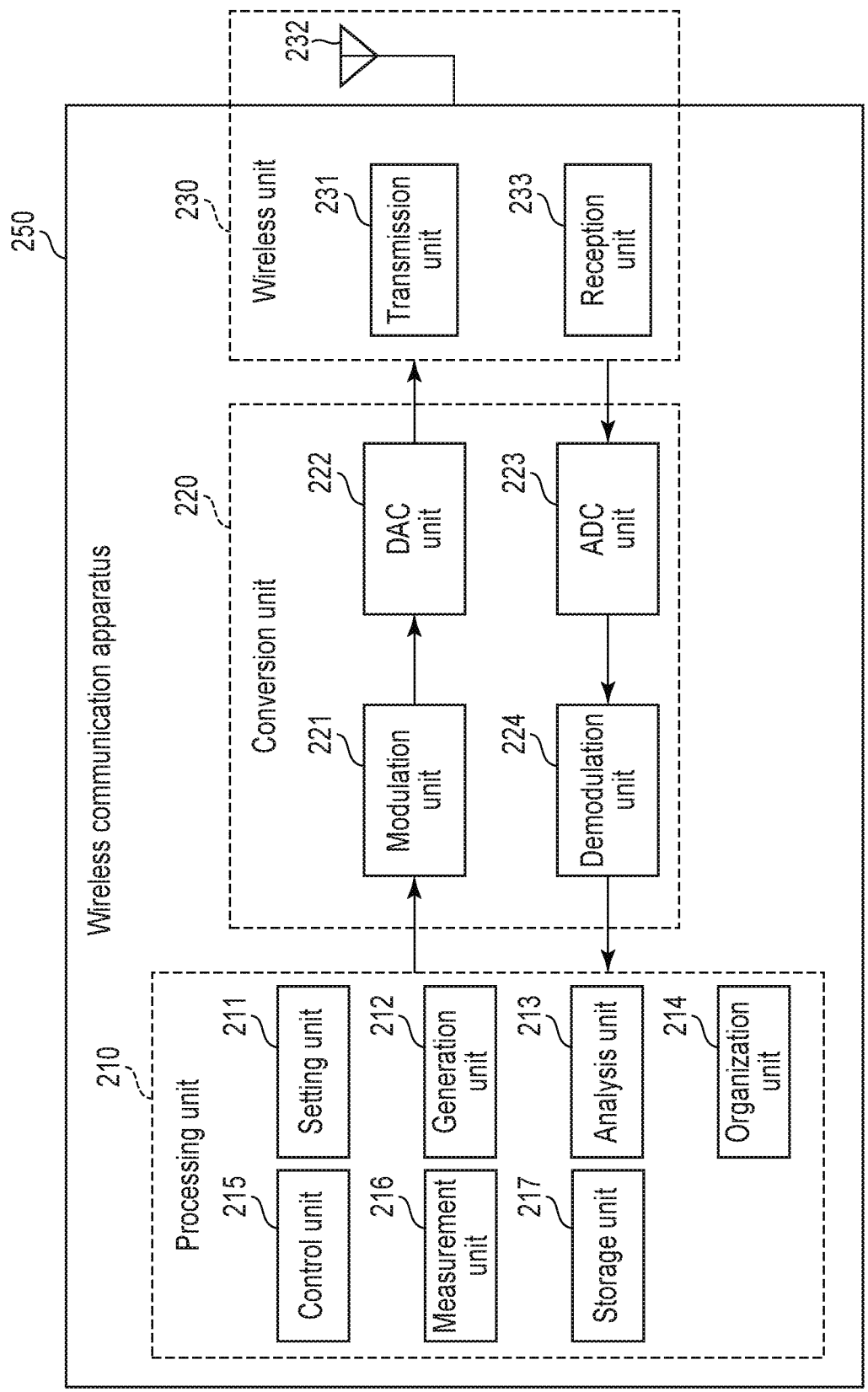
F I G. 19

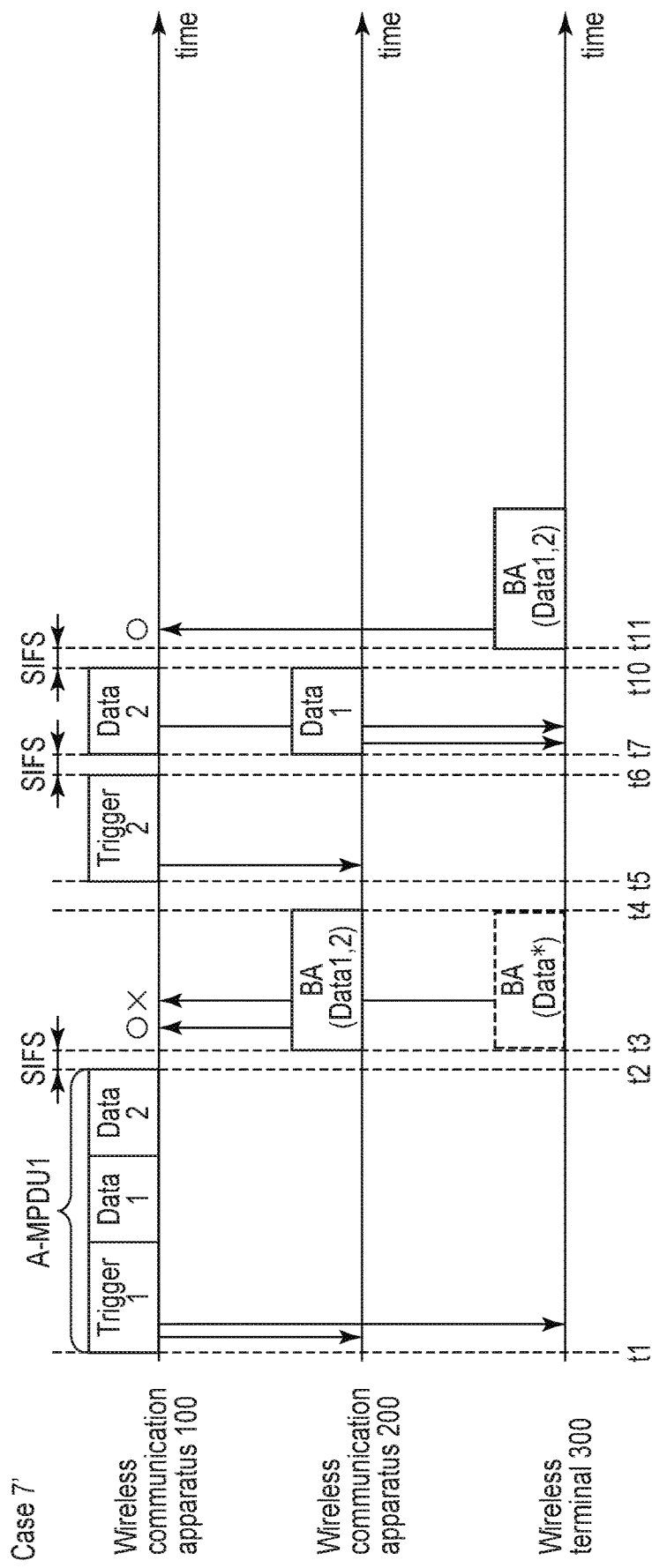
F I G. 21

WIRELESS COMMUNICATION APPARATUS, METHOD, AND WIRELESS COMMUNICATION SYSTEM

CROSS-REFERENCE TO RELATED APPLICATIONS

This application is based upon and claims the benefit of priority from Japanese Patent Application No. 2020-007134, filed Jan. 20, 2020, the entire contents of which are incorporated herein by reference.

FIELD

Embodiments described herein relate generally to a wireless communication apparatus, method and wireless communication system.

BACKGROUND

Wireless communication methods (hereinafter also referred to as cooperative transmission) in which data frame between a plurality of wireless communication apparatuses (access points) are shared and transmitted from these wireless communication apparatuses to wireless terminals (stations) at the same timing have been developed. In these methods, a wireless communication apparatus that shortens a time required to transmit a data frame to a wireless terminal is desired.

BRIEF DESCRIPTION OF THE DRAWINGS

FIG. 3 is a diagram explaining a structural example of a MAC frame.

FIG. 4 is a diagram explaining a structural example of an acknowledgement frame.

FIG. 5 is a diagram explaining a structural example of a trigger frame.

FIG. 7 is a configuration diagram of a wireless communication apparatus 200.

FIG. 8 is a sequence diagram of Case 1.

FIG. 9 is a diagram explaining a structure of A-MPDU1.

FIG. 11 is a flowchart of step S110.

FIG. 19 is a configuration diagram of a wireless communication apparatus 250 applicable to the first embodiment.

FIG. 21 is a sequence diagram of Case 7'.

DETAILED DESCRIPTION

Figure 1:
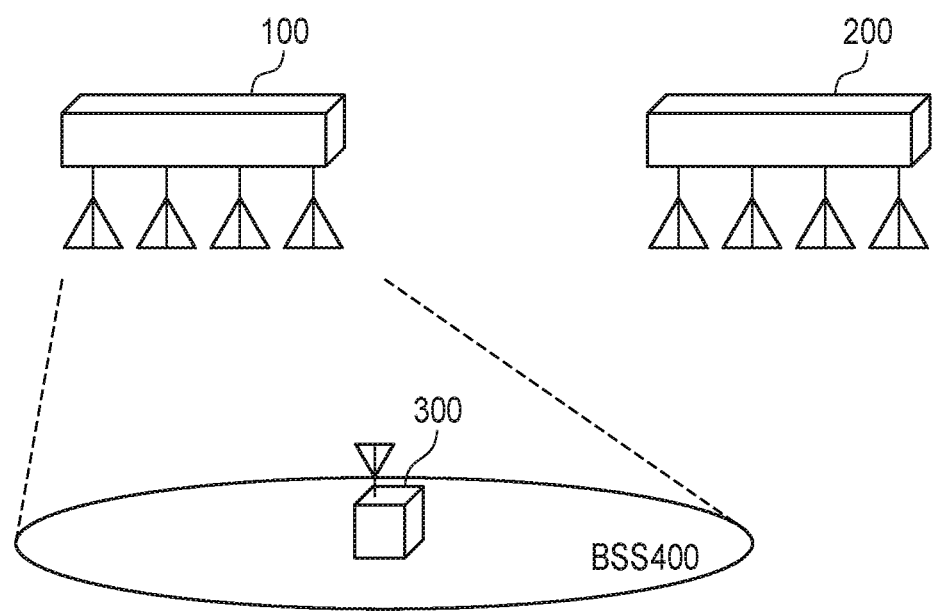
FIG. 1 is a diagram illustrating a wireless communication system according to a first embodiment.

In general, according to one embodiment, a wireless communication apparatus comprises transmitter circuitry, receiver circuitry and processing circuitry. The transmitter circuitry is configured to transmit a first component including data frames to a first wireless communication apparatus and a second wireless communication apparatus. The receiver circuitry is configured to receive a first acknowledgement frame for the data frames from the first wireless communication apparatus and a second acknowledgement frame for the data frames from the second wireless communication apparatus. The processing circuitry is configured to determine, based on the first acknowledgement frame and the second acknowledgement frame, a first data frame received by the first wireless communication apparatus and not received by the second wireless communication apparatus among the data frames. The processing circuitry is configured to determine that the transmitter circuitry transmits at least one of the first data frame and a second data frame different from the first data frame in the first component to the second wireless communication apparatus, and that the first wireless communication apparatus transmits the first data frame to the second wireless communication apparatus.

Embodiments will be described below with reference to the drawings. The disclosure of the embodiments is nothing but one example, and the invention is not limited by the descriptions of the embodiments. Modifications that could easily be conceived by a person with ordinary skill in the art are included in the scope of the disclosure. To clarify the descriptions, the drawings may show, for example, the size and shape of each component more schematically than those in the actual aspect. Elements corresponding to each other in the drawings are denoted by the same reference numeral and their detailed descriptions may be omitted.

First Embodiment

FIG. 1 illustrates a wireless communication system according to a first embodiment. The wireless communication system is a wireless Local Area Network (LAN) system configured by a wireless communication apparatus 100, and includes a wireless communication apparatus 200 and a wireless terminal 300 in addition to the wireless communication apparatus 100. The wireless LAN system in the present embodiment complies with the IEEE 802.11 standard. For example, the wireless LAN system complies with IEEE 802.11 standards that will be specified in the future, in addition to IEEE 802.11a, IEEE 802.11b, IEEE 802.11g, IEEE 802.11n, IEEE 802.11ac, IEEE 802.11ax, IEEE 802.11be, etc. Further, the wireless LAN system is a system in which one wireless communication apparatus and one or more wireless terminals form an infrastructure mode network, and is called Basic Service Set (BSS) in the IEEE 802.11 standard. In FIG. 1, a BSS 400 is illustrated.

The wireless communication apparatus 100 is an access point. In the present embodiment, the access point includes, for example, a wireless base station, a wireless terminal that operates as an access point by changing an operation mode, a wireless terminal of an owner in an ad hoc mode network in which a plurality of wireless communication apparatuses perform direct communication without passing through a wireless base station. The wireless communication apparatus 200 is an access point and can perform wireless communication in response to an instruction from the wireless communication apparatus 100. The wireless terminal 300 is a station belonging to the network of the wireless communication apparatus 100 and performs communication with the wireless communication apparatus 100 or the wireless communication apparatus 200. As an example of communication, a case in which the wireless terminal 300 receives one or more data frames from the wireless communication apparatuses 100 and 200 will be described below. Transmitting one or more data frames to the wireless terminal 300 by the wireless communication apparatus 200 that receives the instruction from the wireless communication apparatus 100 is also referred to as cooperative transmission.

Figure 2:
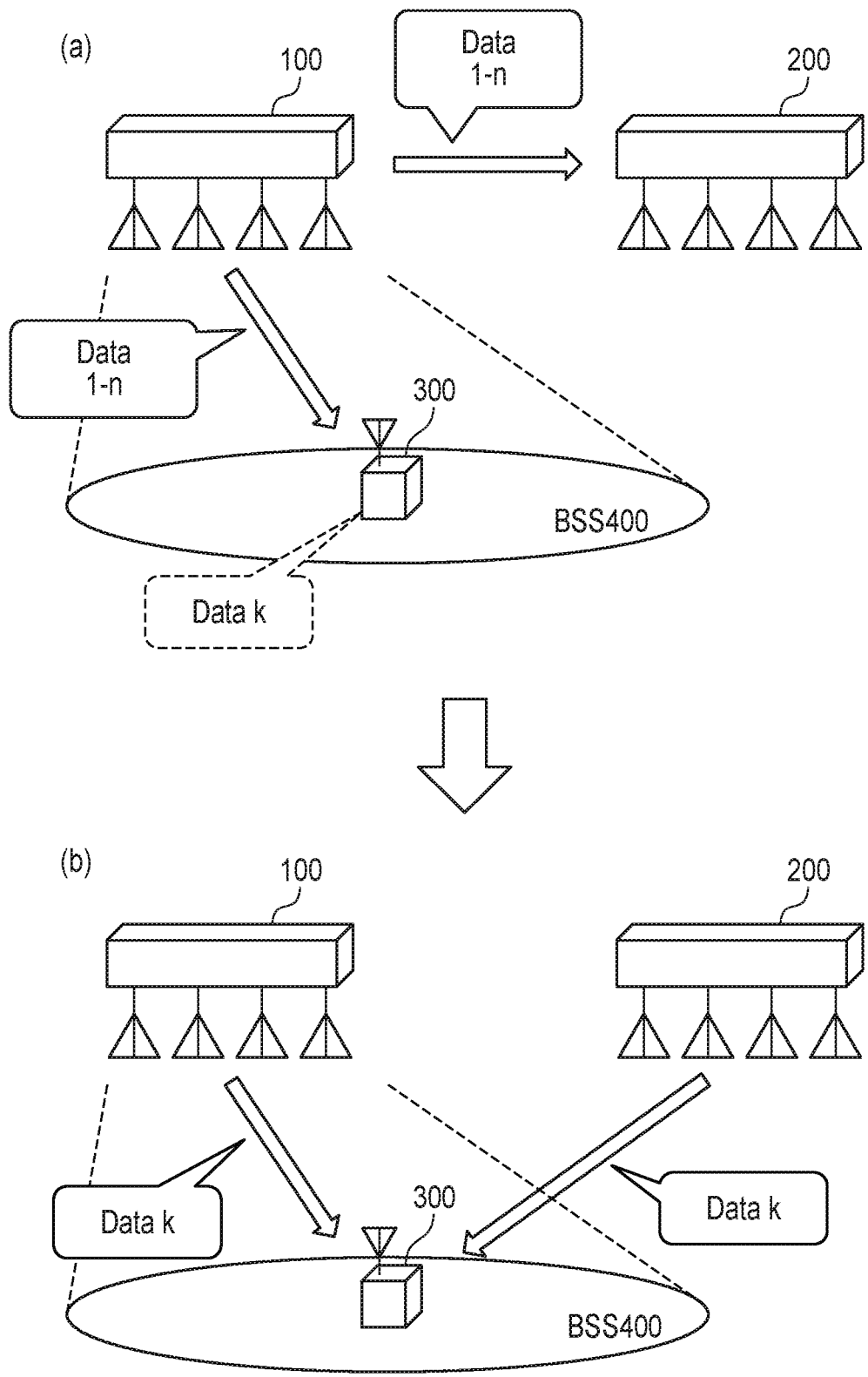
FIG. 2 is diagrams explaining cooperative transmission.

An overview of cooperative transmission will be described with reference to FIG. 2. Regarding FIG. 2A, the wireless communication apparatus 100 transmits data frames 1 to n (n is a natural number) to the wireless communication apparatus 200 and the wireless terminal 300. In FIG. 2, the data frames are referred to as Data 1 to n. It is assumed that the wireless communication apparatus 200 receives the data frames 1 to n, but the wireless terminal 300 cannot receive the data frame k (k is a natural number equal to or less than n) and has received the data frames other than the data frame k. In FIG. 2, the data frame k is referred to as Data k. According to the IEEE 802.11 standard, the wireless communication apparatus and the wireless terminal, which have received the data frame, can notify the transmission source of the received data frame (details will be described below). The wireless communication apparatus 100 receives a frame indicating that the wireless communication apparatus 200 receives the data frames 1 to n and the wireless terminal 300 has received the data frames 1 to n other than the data frame k. Hereinafter, a frame that notifies the transmission source of the received data frame is also referred to as an acknowledgement frame.

In FIG. 2B, the wireless communication apparatus 100 specifies first data frame that the wireless communication apparatus 200 has received and the wireless terminal 300 has not received, based on the received acknowledgement frame. In FIG. 2, the wireless communication apparatus 100 specifies that the first data frame is the data frame k. Note that "not received" includes a data frame in which an error has been found although it has been received. The wireless communication apparatus 100 transmits the data frame k to the wireless terminal 300 in cooperation with the wireless communication apparatus 200. That is, the wireless communication apparatus 100 transmits, to the wireless communication apparatus 200, an instruction to transmit the data frame k to the wireless terminal 300, and the data frame k is transmitted to the wireless terminal 300 at the timing when the wireless communication apparatus 200 transmits the data frame k. Note that, in the present embodiment, the same names are given to the data frames including the same data. For example, the data frame k includes the same data k even when the wireless communication apparatuses 100 and 200 have different information indicating the transmission source, and thus both will be referred to as the data frame k.

In the present embodiment, the wireless communication apparatus 100 can share the data frames 1 to n with the wireless communication apparatus 200 and transmit the data frames 1 to n to the wireless terminal 300 at once. When all the data frames 1 to n are transmitted in cooperation with the wireless communication apparatus 200, a period for sharing the data frames 1 to n is required between the wireless communication apparatuses 100 and 200. However, in the present embodiment, the shared period can also be used for transmission of the data frames 1 to n to the wireless terminal 300. Therefore, it is possible to reduce the time for transmitting the data frames 1 to n to the wireless terminal 300. Further, in the present embodiment, the wireless communication apparatuses 100 and 200 cooperatively transmit only the data frame k that the wireless terminal 300 has not received among the data frames 1 to n. Therefore, compared with the case in which all the data frames 1 to n are transmitted in cooperation with the wireless communication apparatus 200, the occupied time of the frequency band used for cooperative transmission can be reduced, and the processing associated with the data frame reception of the wireless terminal 300 for cooperative transmission can be reduced.

Since the wireless communication apparatuses 100 and 200 and the wireless terminal 300 comply with the IEEE 802.11 standard, a Medium Access Control (MAC) frame complying with this standard will be described with reference to FIGS. 3 to 5. The MAC frame includes a data frame, an acknowledgement frame, a trigger frame for instructing the wireless communication apparatus 200 and the wireless terminal 300, and the like.

FIG. 3 is a diagram explaining a structural example of a MAC frame. Hereinafter, a case in which the data frame is used as an example will be described. The MAC frame includes a MAC header unit that sets information required for reception processing, a Frame Body unit in which information according to a type of a frame set in the MAC header unit is set, and a Frame Check Sequence (FCS) unit. In the case of the data frame, information indicating that it is a data frame is set in the MAC header unit, and data is included in the Frame Body unit. The FCS unit includes an error detection code (Cyclic Redundancy Code: CRC) used when determining whether the Frame Body has been received without error.

Details of the MAC header unit will be described below. The MAC header unit includes a Frame Control field, a Duration/ID field, an Address 1-4 fields, a Sequence Control field, and a QoS Control field. In the Frame Control field, a value according to the type of the frame is set. Details will be described below.

In the Duration/ID field, a period (Network Allocation Vector: NAV) in which the target wireless communication apparatus or wireless terminal waits for transmission is set. Hereinafter, the wireless communication apparatus or the wireless terminal includes a wireless communication apparatus, a wireless terminal, or a wireless communication apparatus and a wireless terminal. In the Duration/ID field, an identification number assigned to a station belonging to the network configured by the access point (hereinafter, this station is also referred to as a station connecting to the access point) is set. The Duration/ID field has a length of 16 bits as an example. When the most significant bit (MSB) is 0, the lower (remaining) 15 bits represent NAV, and when the MSB is 1, an identification number is included in the lower 15 bits.

A plurality of Address fields are set. In FIG. 3, four Address fields, that is, Address 1, Address 2, Address 3, and Address 4 are set. In the Address 1 field, identification information of the wireless terminal or the wireless communication apparatus which is a direct destination is set. Thereafter, for example, a MAC address is set as the identification information. According to the identification information set in the Address 1 field, the wireless communication apparatus or the wireless terminal determines whether the received frame is addressed to itself. In the Address 2 field, identification information of the wireless terminal or the wireless communication apparatus which is a direct transmission source is set. The Address 3 field differs between the case of uplink and the case of downlink. In the case of the uplink, the identification information of the wireless terminal or the wireless communication apparatus which is the final destination is set in the Address 3 field. On the other hand, in the case of the downlink, the identification information of the wireless terminal or the wireless communication apparatus which is the original transmission source is set in the Address 3 field. The Address 4 field is set when the wireless base station transmits a MAC frame to another wireless base station. In the Address 4 field, identification information of the wireless terminal or the wireless communication apparatus which is a transmission source is set.

In the Sequence Control field, the sequence number of the data included in the Frame Body unit is set. Further, when a large amount of data is divided and transmitted (fragmented) in a data frame, a fragment number that is a serial number of the divided data may be set. The QoS Control field is described after details of the Frame Control field is described, and thus description thereof is omitted herein.

Hereinafter, details of the Frame Control field will be described. The Frame Control field includes a Protocol Version field, a Type field, a Subtype field, a To DS field, a From DS field, a More Fragment field, a Retry field, a Protected Frame field, and a +HTC/Order field. In the Protocol Version field, the version of the communication protocol is set.

In the Type field, a frame type is set. The frame type is, for example, a data frame, a control frame, a management frame used when a station connects to an access point, or the like. In the present embodiment, when the wireless communication apparatus 100 transmits the data frame to the wireless communication apparatus 200 and the wireless terminal 300, the data frame is set. In the Subtype field, the type of the MAC frame is set within the frame type set in the Type field.

In the To DS field, information indicating whether the direct transmission destination is the wireless communication apparatus or the wireless terminal is set. In the From DS field, information indicating that the direct transmission source is the wireless communication apparatus or the wireless terminal is set. The More Fragment field is set when the above-described data is fragmented. In FIG. 3, it is represented as More Frag. In the More Fragment field, information indicating whether there is a data frame including fragmented data following this frame is set. The Retry field is set when the frame is a frame to be retransmitted. In the Protected Frame field, information indicating whether the data included in the Frame Body unit is protected (encrypted) is set.

The +HTC/Order field has different settings according to whether the frame is a QoS Data frame or a non-QoS Data frame. The QoS Data frame and the non-QoS Data frame are types of data frames set by standards such as IEEE 802.11n, 11ac, or 11ax, and are set by Subtype described above. Details will be described below. When the frame is the non-QoS Data frame, information indicating that the frames are relayed in the frame order and the order is not changed is set in the +HTC/Order field. When the frame is the QoS Data frame, information indicating that the HT Control field is included is set in the +HTC/Order field. The HT Control field is a field for setting remark information about communication. Although not illustrated in FIG. 3, when the HT Control field is set, the HT Control field is set between the QoS Control field and the Frame Body unit. The HT Control field is used to notify a part of the functions specified in standards such as IEEE 802.11n, 11ac, or 11ax.

Details of the Frame Control field have been described above. The above-mentioned QoS Control field will be described below. A Traffic ID (TID) field, an Ack Policy field, and the like are set in the QoS Control field (both are not illustrated). The QoS Control field is set when the frame is the QoS Data frame, and is not set when the frame is the non-QoS Data frame. In the TID field, an identifier according to the type of data (traffic) is set. For example, there are 16 types of the identifier from 0 to 15, and the type of data is set. In the Ack Policy field, the acknowledgement method returned by the destination of the frame is set. For example, as the acknowledgement method, Normal Ack Policy, Block Ack Policy, No Ack Policy, and the like are set. In the case of the Normal Ack Policy, the wireless communication apparatus or the wireless terminal that has received the frame immediately returns the acknowledgement frame. In case of the Block Ack Policy, the wireless communication apparatus or the wireless terminal of the transmission destination is a method of receiving a plurality of frames including the corresponding frame and then collectively returning (in Block Ack) the acknowledgement frame.

The entire MAC header unit and MAC frame in the present embodiment have been described above. In the above description, the case of using as the data frame has been described, but it is applicable not only to the data frame but also to the control frame, the management frame, and the like. Each field of the MAC frame described in the present embodiment is an example and is not limited to the above-described fields. For example, in the IEEE 802.11 standard, fields other than the Frame Control field, the Duration (Duration/ID) field, and the Address 1 field may be appropriately selected according to individual frames. Further, as in the IEEE 802.11e standard, the MAC frame including the fields set by the new standard is applicable to the present embodiment, so that the QoS Control field is added to the MAC header unit.

FIG. 4 is a diagram explaining the structure of the acknowledgement frame as the MAC frame used in the present embodiment. The acknowledgement frame in the present embodiment is a Block Ack frame that can collectively acknowledge a plurality of received frames. Hereinafter, Block Ack is also referred to as BA. The BA frame includes a Frame Control field, a Duration field, an Address 1 field, an Address 2 field, a BA Control field, a BA Information field, and an FCS field. Since the Frame Control field, the Duration field, the Address 1 field, the Address 2 field, and the FCS field are the same as the fields with the same names described in the MAC frame, description thereof will be omitted. Note that the Duration field of the BA frame corresponds to the Duration/ID field of the MAC frame. The information indicating the BA frame is set in the Type and Subtype fields of the Frame Control field.

The BA Control field includes a Compressed Bitmap field and a TID Info field. In the Compressed Bitmap field, information about the length of the BA Bitmap field is set. Acknowledgement information is set in the BA Bitmap field, which will be described below in detail. In the IEEE 802.11 standard, the BA Bitmap field length (degree of shortening) may differ depending on the standard. In the Compressed Bitmap field, information indicating whether the length of the BA Bitmap field has been shortened and information indicating the degree of shortening according to the standard of the BA Bitmap field are set. In the TID Info field, information indicating the TID included in the BA Bitmap field is set. The TID is associated with the TID of the data frame that is the acknowledgement target.

The BA Information field includes a Starting Sequence Number (SSN) field and a BA Bitmap field. In the SSN field, the information of the sequence number of the first data frame among pieces of acknowledgement information of a plurality of data frames included in the subsequent BA Bitmap field is set. In the BA Bitmap field, information indicating acknowledgement information indicating whether the data frame having the sequence number starting from the number set in the SSN field is received without error is set. In the BA Bitmap field, acknowledgement information is set in a 1-bit bitmap format for each data frame. For example, BA Bitmap can indicate acknowledgement information of 64 data frames. When the sequence number indicated by the SSN field is 100, acknowledgement information of the data frames with sequence numbers 100 to 163 is set in the subsequent BA Bitmap field.

FIG. 5 is a diagram explaining a structure of a trigger frame as the MAC frame in the present embodiment. The trigger frame is a frame instructing the wireless communication apparatus or the wireless terminal. For example, in the present embodiment, when data is transmitted from the wireless communication apparatus 100 to the wireless communication apparatus 200 and the wireless terminal 300, the trigger frame is used for an instruction of a target to be received or an instruction of a transmission method of an acknowledgement frame. In the present embodiment, the wireless communication apparatus or the wireless terminal performs multiplexing and transmission. As the transmission method, for example, there are Orthogonal Frequency Multiple Access (OFDMA) that multiplexes users by frequency, or Multi-User Multiple input Multiple Output (MU-MIMO).

Further, when the wireless communication apparatus 100 and the wireless communication apparatus 200 perform cooperative transmission to the wireless terminal 300, it is also used when the transmission method or the like is instructed to the wireless communication apparatus 200. The trigger frame includes a Frame Control field, a Duration field, an Address 2 field, a Common Info field, a User Info 1 to n fields, and an FCS field. Since the Frame Control field, the Duration field, the Address 1 field, the Address 2 field, and the FCS field are the same as the fields with the same names described in the MAC frame, description thereof will be omitted. Note that the Duration field of the trigger frame corresponds to the Duration/ID field of the MAC frame. The information indicating the trigger frame is set in the Type and Subtype fields of the Frame Control field.

In the Address 1 field, identification information of the wireless terminal or the wireless communication apparatus to be instructed is set. In the Address 1 field, it is also possible to set the address of a group of wireless communication apparatuses or wireless terminals set in advance. Examples of the address of the group include a Broadcast address or a Multicast address.

In the Common Info field, information common to the wireless communication apparatus or the wireless terminal to be instructed is set. The Common Info field includes a Trigger Type field, a UL Length field, and a Common PHY parameter field. In the Trigger Type field, information indicating the type of the trigger frame is set. For example, when data is transmitted to the wireless communication apparatus or the wireless terminal to be instructed, the Basic type is set when the acknowledgement in the BA frame is requested for data frames aggregated in the same A-MPDU (described below) as the trigger frame. The MU-RTS type is set when the wireless communication apparatus or the wireless terminal to be instructed is requested to transmit a CTS frame. In the UL Length field, information about the transmission time of the frame transmitted by the wireless communication apparatus or the wireless terminal to be instructed (for example, time in Psec unit) or information capable of calculating the transmission time (for example, number of bytes) is set. The information set in the UL Length field enables the wireless communication apparatus or the wireless terminal to be instructed (multiplexed and transmitted) to perform transmission with the frame ends aligned. In the Common PHY parameter field, information about parameters used in the PHY layer, which is matched by the wireless communication apparatus or the wireless terminal to be instructed, is set. Examples of the information about the parameters include information about the frequency bandwidth (20 MHz, 40 MHz, 80 MHz, etc.) used for transmission, information indicating the length of the guard interval set in the PHY payload, and the like. With these pieces of information, the wireless communication apparatus or the wireless terminal to be instructed can perform multiplexing and transmission.

In the User Info field, individual instructions to the wireless communication apparatus or the wireless terminal are set. Each User Info field includes an AID field, an RU position field, and a User PHY parameter field. In FIG. 5, the User Info field is represented as User Info 1 to n, but the User Info field is set according to the number of wireless communication apparatus or wireless terminals to be instructed. In the AID field, an ID that is locally set by the access point constituting the network is set. In the present embodiment, the ID that is locally set by the wireless communication apparatus 100 is set. This ID is also called an AID, and a number other than 0 is assigned. The AID enables the wireless communication apparatus or the wireless terminal to determine whether the received trigger frame is addressed to itself. In the RU position field, information indicating the position of the Resource Unit (RU) that can be used by the wireless communication apparatus or the wireless terminal instructed by the trigger frame is set. Here, the OFDM communication is a method in which transmission data is divided into a plurality of carriers called subcarriers and transmitted in parallel in the frequency axis direction. Conventionally, a plurality of subcarriers that fit within a 20 MHz width are arranged, and data for one user is placed on the plurality of subcarriers and transmitted. In the OFDMA method, a part of the PHY frame is divided into a certain number of subcarriers as one resource unit, and the one unit is assigned to one wireless communication apparatus or wireless terminal. Therefore, it is possible to simultaneously transmit data of the plurality of wireless communication apparatuses or wireless terminals within the same bandwidth as when data is transmitted by OFDM. According to the IEEE 802.11ax, the RU may take various sizes and each size is determined by the number of subcarriers. Further, the frequency positions where the RUs are placed are specified, and a serial number is set to identify each RU. This RU is shared between the access point and the station. The wireless communication apparatus or the wireless terminal that receives the instruction in the trigger frame can recognize the frequency position and frequency bandwidth used for transmission by referring to the number in the RU position field. In the User PHY parameter field, information about parameters used in the PHY layer by the wireless communication apparatus or the wireless terminal that receives the instruction in the trigger frame is set. For example, PHY transmission information such as Modulation and Code Scheme (MCS) Index indicating the transmission rate of data or number of streams (number of space time streams), applicable error correction code type (Low Density Parity Check: LDPC, etc.), transmission power information, or the like is set. The transmission power is set, for example, in order to control the reception power of the wireless communication apparatus 100 to be approximately the same in the frames from the respective wireless communication apparatuses or wireless terminals.

Figure 6:
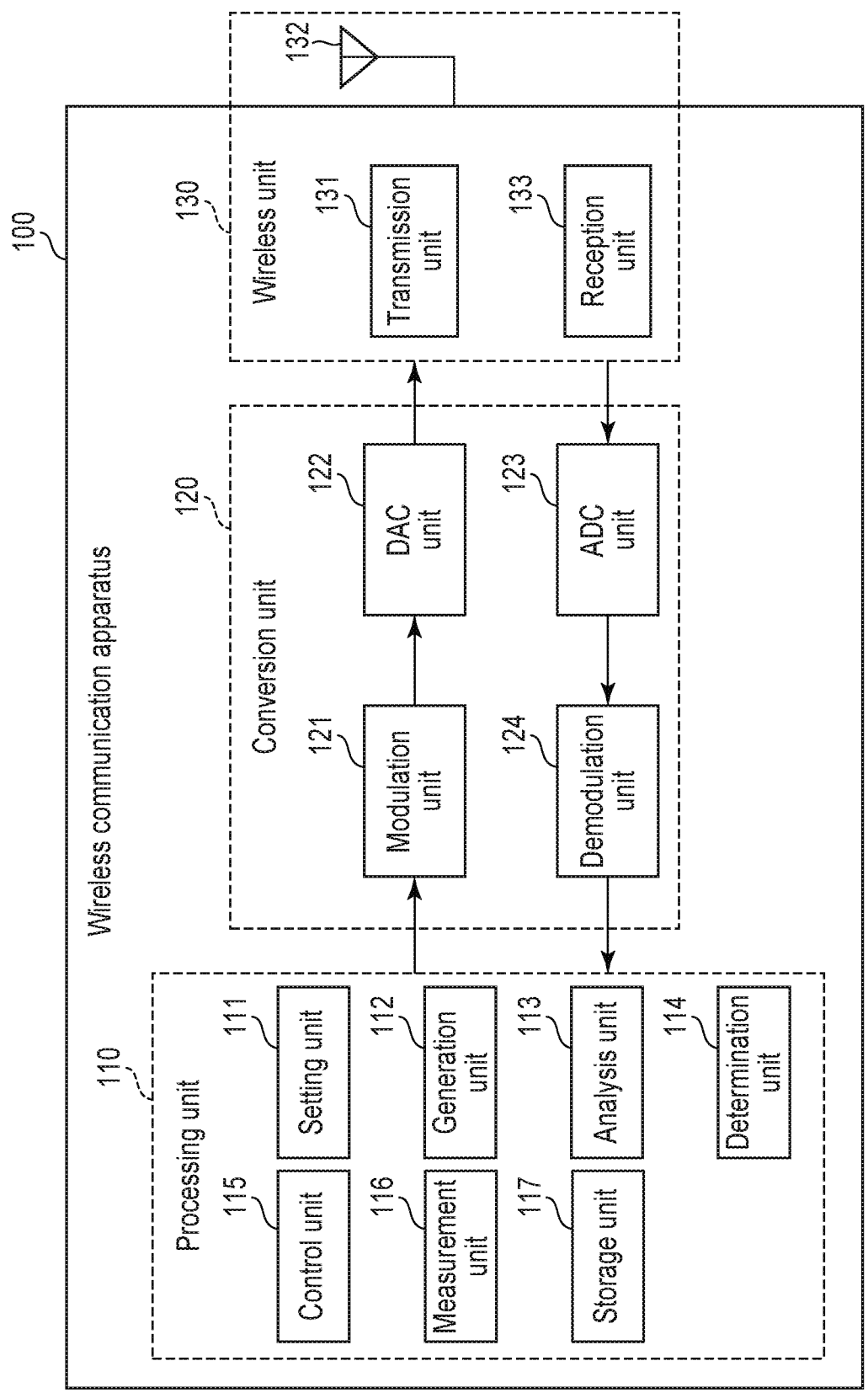
FIG. 6 is a configuration diagram of a wireless communication apparatus 100.

The structure of the MAC frame used in the present embodiment has been described above. The configuration of the wireless communication apparatus 100 of the present embodiment will be described with reference to FIG. 6. The wireless communication apparatus 100 includes a processing unit 110, a conversion unit 120, and a wireless unit 130. The processing unit 110 includes a setting unit 111, a generation unit 112, an analysis unit 113, a determination unit 114, a control unit 115, a measurement unit 116, and a storage unit 117. For example, the processing unit 110 is responsible for the processing specified by the MAC layer in the IEEE 802.11 standard. The conversion unit 120 includes a modulation unit 121, a digital to analog converter (DAC) unit 122, an analog to digital converter (ADC) unit 123, and a demodulation unit 124. The wireless unit 130 includes a transmission unit 131, an antenna 132, and a reception unit 133. The conversion unit 120 and the wireless unit 130 are responsible for processing specified by the PHY layer in the IEEE 802.11 standard, for example. Upon transmitting the MAC frame, in the wireless communication apparatus 100, the processing unit 110 generates the MAC frame, the conversion unit 120 converts digital into analog, and the wireless unit 130 transmits the wireless signal. Upon receiving the MAC frame, in the wireless communication apparatus 100, the wireless unit 130 receives the wireless signal, the conversion unit 120 converts analog into digital, and the processing unit 110 performs various processes on the digital-converted MAC frame. Note that, the processing unit 110 is referred to processing circuitry, the transmission unit 131 is referred to transmitter circuitry, the reception unit 133 is referred to receiver circuitry.

When the wireless communication apparatus 100 transmits the MAC frame, the setting unit 111 performs setting necessary when the modulation unit 121 performs a process associated with transmission (hereinafter, also referred to as a transmission process). This setting is, for example, the transmission rate, the byte length of the frame to be transmitted, the PHY format, and the like. This setting is transmitted to the modulation unit 121, and the transmission process is performed. The generation unit 112 generates the MAC frame to be transmitted. The MAC frame to be transmitted is transmitted to the modulation unit 121.

The analysis unit 113 analyzes whether the received and demodulated MAC frame is received without error, and extracts a variety of information such as identification information of the wireless communication apparatus or the wireless terminal, the information about the frame type, the information about the instruction (in the case of the trigger frame), the data (in the case of the data frame), the acknowledgement information (in the case of the acknowledgement frame) included in the MAC frame. The analysis unit 113 may be capable of extracting a variety of information included in the MAC frame generated by the generation unit 112. The analysis unit 113 transmits the acknowledgement information to the determination unit 114.

The determination unit 114 recognizes the data frame received by the wireless communication apparatus 200 and the wireless terminal 300 and the data frame not received by the wireless communication apparatus 200 and the wireless terminal 300, based on the acknowledgement information transmitted from the analysis unit 113. The determination unit 114 determines the data frame to be retransmitted to the wireless terminal 300 based on the acknowledgement information, and determines whether the wireless communication apparatus 100 alone transmits the data frame upon retransmission and whether the wireless communication apparatus 100 transmits the data frame upon retransmission in cooperation with the wireless communication apparatus 200. The determination unit 114 transmits the determination result to the control unit 115.

The control unit 115 issues the instructions related to a process in the setting unit 111, the generation unit 112, the analysis unit 113, and the determination unit 114. For example, the control unit 115 instructs the setting unit 111 and the generation unit 112 to set necessary information or generate the MAC frame based on the information extracted by the analysis unit 113. Based on the determination result of the determination unit 114, the control unit 115 instructs the generation unit 112 to generate the MAC frame based on the certain transmission method (single transmission of the wireless communication apparatus 100 or cooperative transmission with the wireless communication apparatus 200) including the data to be retransmitted. The control unit 115 instructs the time at which various processes are to be performed, based on the time measured by the measurement unit 116 described below. For example, the control unit 115 determines the timing at which the wireless signal is transmitted from the wireless unit 130, and instructs various processes so that the wireless signal can be transmitted at this timing. The control unit 115 may instruct the modulation unit 121, the DAC unit 122, the ADC unit 123, the demodulation unit 124, the transmission unit 131, and the reception unit 133 to perform various operations. Further, the control unit 115 also causes the storage unit 117 to hold the information extracted by the analysis unit 113.

The measurement unit 116 measures the time and transmits the measured time to the control unit 115. The measurement unit 116 may measure the time when the MAC frame is transmitted. The storage unit 117 holds the information transmitted from the control unit 115. Examples of the information include the D information of the wireless communication apparatus 200, the ID information of the wireless terminal. 300, or the like. The ID information includes a MAC address or a local ID determined by the wireless communication apparatus 100 when the network is constructed. The storage unit 117 is a memory or the like and includes, for example, Random Access Memory (RAM), Programmable ROM (PROM), Erasable PROM (EPROM), Electrically EPROM (EEPROM), flash memory, registers, and the like. Further, the storage unit 117 may be provided inside or outside the wireless communication apparatus 100. When provided outside the wireless communication apparatus 100, the storage unit 117 may be a cloud that holds information via the Internet.

The processing unit 110 is one or more electronic circuits including a control apparatus and a computing apparatus. The electronic circuit is realized by an analog or digital circuit or the like. Examples of the electronic circuit include a general purpose processor, a central processing unit (CPU), a microprocessor, a digital signal processor (DSP), an ASIC, an FPGA, and combinations thereof. Further, the processing unit 110 may be executed on these electronic circuits by software.

The modulation unit 121 performs the transmission process of the MAC frame generated by the generation unit 112 according to the setting of the setting unit 111. This transmission process is a certain modulation and coding process that complies with each IEEE 802.11 standard. The MAC frame, on which the transmission process has been performed, is transmitted to the DAC unit 122. The DAC unit 122 converts the MAC frame transmitted from the modulation unit 121 so that the digital signal is converted into the analog signal (baseband signal). The MAC frame that has become the baseband signal is transmitted to the transmission unit 131.

The transmission unit 131 up-converts the MAC frame of the baseband signal transmitted from the DAC unit 122 into a certain frequency band, and transmits the up-converted MAC frame as the wireless signal via the antenna 132. The certain frequency band is, for example, a frequency band complying with the wireless signal standard such as a 2.4 GHz band and a 5 GHz band.

The reception unit 133 receives the wireless signal (analog signal) of the MAC frame in the certain frequency band via the antenna 132. The reception unit 133 down-converts the received wireless signal and converts the down-converted wireless signal into the baseband signal (analog signal) of the MAC frame. The converted baseband signal of the MAC frame is transmitted to the ADC unit 123.

The ADC unit 123 converts the baseband signal of the MAC frame transmitted from the reception unit 133 so that the analog signal is converted into the digital signal. The MAC frame that has become the digital signal is transmitted to the demodulation unit 124. The demodulation unit 124 performs a process associated with reception (hereinafter, also referred to as a reception process) on the MAC frame that has become the digital signal. Examples of the reception process include an OFDM symbol timing synchronization process, a Fast Fourier Transform (FFT) process, a deinterleave process, and an error correction decoding process. The MAC frame that has undergone the reception process is transmitted to the analysis unit 113.

The configuration of the wireless communication apparatus 100 has been described above. The same applies to the configurations of the wireless communication apparatus 200 and the wireless terminal 300, but the configurations without the determination unit 114 may be used. For example, the configuration of the wireless communication apparatus 200 is illustrated in FIG. 7. The wireless communication apparatus 200 includes a processing unit 210, a conversion unit 220, and a wireless unit 230. The processing unit 210 includes a setting unit 211, a generation unit 212, an analysis unit 213, a control unit 215, a measurement unit 216, and a storage unit 217. The conversion unit 220 includes a modulation unit 221, a DAC unit 222, an ADC unit 223, and a demodulation unit 224. The wireless unit 230 includes a transmission unit 231, an antenna 232, and a reception unit 233. The components of the wireless communication apparatus 200 correspond to the components of the same names among the components of the wireless communication apparatus 100.

The wireless communication apparatus 100 is intended to transmit data to the wireless terminal 300. As an example, a case in which two data frames, that is, data frame 1 and data frame 2 (hereinafter, also referred to as data frames 1 and 2) are transmitted from the wireless communication apparatus 100 to the wireless terminal 300 will be described as the operations of the wireless communication apparatuses 100 and 200 and the wireless terminal 300. Note that the two data frames are an example, and the data frame may be one data frame or three or more data frames. Further, it is assumed that the arrangements required for communication are set in advance between the wireless communication apparatuses 100 and 200 and the wireless terminal 300. Data frame 1 and data frame 2 each include one or more data. Here, the data frame is a frame for transmitting data generated inside the wireless communication apparatus to another wireless communication apparatus. For example, the data frame refers to a frame, of which data is included in the Frame Body unit of the MAC frame, or a frame in which the Type field in the MAC frame is set to a "data frame" type. On the other hand, the data is generated in the upper layer of the present embodiment and is generated by, for example, a user operation.

When transmitting two data frames between the wireless communication apparatuses 100 and 200 and the wireless terminal 300, a plurality of cases can be considered, but the operations of the wireless communication apparatuses 100, 200, and 300 will be described using Case 1 of FIG. 8. The remaining cases other than Case 1 will be described after the operations of the wireless communication apparatuses 100, 200, and 300 are described.

FIG. 8 is a sequence diagram of the wireless communication apparatuses 100 and 200 and the wireless terminal 300 in Case 1. The operations from the generation to the transmission of the MAC frame in the wireless communication apparatuses 100 and 200 and the wireless terminal 300 and the operation from the reception to the recognition of the contents of the MAC frame in the wireless communication apparatuses 100 and 200 and the wireless terminal 300 are the same as those of the processing unit 110, the conversion unit 120, and the wireless unit 130, and thus description thereof will be omitted.

Case 1 is a case in which the wireless communication apparatus 200 receives the data frames 1 and 2 transmitted by the wireless communication apparatus 100, but the wireless terminal 300 does not receive the data frames 1 and 2. The wireless communication apparatus 100 transmits the data frames 1 and 2 in cooperation with the wireless communication apparatus 200. In FIG. 8, the data frame 1 is referred to as Data 1 and the data frame 2 is referred to as Data 2. The discrimination between the data frames 1 and 2 is made based on, for example, the sequence number included in the data frame.

The wireless communication apparatus 100 transmits the trigger frame 1 and the data frames 1 and 2 to the wireless communication apparatus 200 and the wireless terminal 300 at time t. The trigger frame 1 is the trigger frame illustrated in FIG. 5 and is a frame for instructing the wireless communication apparatus 200 and the wireless terminal 300 to acknowledge whether the data frames 1 and 2 have been received by using the BA frame. In FIG. 8, the trigger frame 1 is called Trigger 1.

In the present embodiment, as an example, the wireless communication apparatus 100 transmits the trigger frame 1 and the data frames 1 and 2 in the format of Aggregated MAC Protocol Data Unit (A-MPDU). A-MPDU is a method of aggregating a plurality of MAC frames (MPDU) and transmitting the aggregated MAC frames as one frame from the wireless apparatus. That is, the wireless communication apparatus 100 transmits A-MPDU1 in which the trigger frame 1, the data frames 1 and 2 are aggregated at the time t1. FIG. 9 is a diagram explaining the structure of A-MPDU1. In A-MPDU1, the trigger frame 1, two data frames 1, and two data frames 2 are divided by a delimiter field (referred to as Delimiter in FIG. 9). The destination (transmission destination) of the trigger frame 1 is a group (referred to as Group in FIG. 9) and is a group including both the wireless communication apparatus 200 and the wireless terminal 300. The destinations of the two data frames 1 and 2 are each set in the wireless communication apparatus 200 and the wireless terminal 300. Note that the data included in the data frame 1 is the same even though the destination is different. Similarly, in the data frame 2, the data included inside is the same even though the destination is different. The delimiter field is a field indicating the boundary of the MAC frame in A-MPDU1. In the delimiter field, byte length information of the MAC frame immediately after, an identifier indicating a delimiter, CRC, and the like are set. The delimiter field allows the receiving side to recognize the trigger frame 1, the data frame 1, and the data frame 2 as individual MAC frames. Note that the trigger frame 1 indicates the position of the RU used by the wireless communication apparatus 200 and the wireless terminal 300 so as to transmit the BA frame. As illustrated in FIG. 8, when the time periods in which the wireless communication apparatus 200 and the wireless terminal 300 transmit the BA frame at least partially match each other, the wireless communication apparatus 200 and the wireless terminal 300 are instructed to use different frequency bands for transmission.

The wireless communication apparatus 200 and the wireless terminal 300 receive A-MPDU1. The wireless communication apparatus 200 and the wireless terminal 300 determine whether the data frames 1 and 2 have been received without error by using CRC. The wireless communication apparatus 200 causes the storage unit 217 to hold the data frame received without error. The wireless communication apparatus 200 may store, in the storage unit 217, the data included in the data frame received without error.

Note that, in the present embodiment, a format having a structure in which one or more MAC frames (MPDU) are aggregated is also referred to as a "component". One component may include a plurality of MAC frames such as the trigger frame 1 and the data frame 1, or may include only one MAC frame. Here, when only one MAC frame is included, one component may include one delimiter field and one MAC frame. Alternatively, one component may include only one MAC frame (in this case, one component is equal to one MAC frame).

The time from time t2 when the wireless communication apparatus 100 finishes transmitting A-MPDU1 (hereinafter, also referred to as a termination) to time t3 is a Short Interframe Spacing (SIFS) time. The SIFS time is a time to wait for transmission (hereinafter, also referred to as a waiting time) specified in the IEEE 802.11 standard. When the SIFS time has elapsed, the acknowledgement frame is preferentially transmitted. The wireless communication apparatus 200 and the wireless terminal 300 transmit the acknowledgement frames of the data frames 1 and 2 to the wireless communication apparatus 100 from time t3, which is a time after the SIFS time has elapsed from time t2. In the present embodiment, the BA frame illustrated in FIG. 4 is used as the acknowledgement frame. The BA frame allows the wireless communication apparatus 100 to recognize the data frame received by the wireless communication apparatus 200 and the wireless terminal 300 without error. In FIG. 8, as a result obtained when the wireless communication apparatus 100 receives the BA frame, it is recognized that the wireless communication apparatus 200 receives the data frames 1 and 2, but the wireless terminal 300 does not receive the data frames 1 and 2.

The wireless communication apparatus 100 determines the data frame received by the wireless communication apparatus 200 and not received by the wireless terminal 300, based on the information about the BA frame. The information about the BA frame includes the BA frame received by the wireless communication apparatus 100 and the transmission destination of the data frame for which the wireless communication apparatus 100 has not received the BA frame. The case in which the data frame is not received is a case in which the wireless communication apparatus 100 can determine that the destination of the data frame has not received the data frame. For examples, there are a case in which no data frame has not been received (has not arrived), a case in which the data frame is received but there is an error, a case in which the data frame is received without error, but the BA frame is not arrived to the wireless communication apparatus 100, and the like.

Note that, in FIG. 8, the wireless communication apparatus 100 expresses O when the BA frame has been received, and expresses X when the BA has not been received (when the wireless communication apparatus 100 can determine that the transmission destination of the data frame has not received the data frame). Data* in FIG. 8 may be any of data frame 1, data frame 2, or data frames 1 and 2, and includes a case in which the BA frame is not transmitted. In the case of Data*, the wireless communication apparatus 100 has not received the BA frame, and thus determines that the data frame has not been received. Hereinafter, the same expression is used for the reception of the BA frame of the wireless communication apparatus 100.

In FIG. 8, the wireless communication apparatus 100 determines that the data frames received by the wireless communication apparatus 200 and not received by the wireless terminal 300 are data frames 1 and 2. The wireless communication apparatus 100 determines to perform cooperative transmission with the wireless communication apparatus 200 for these determined data frames. The wireless communication apparatus 100 transmits, to the wireless communication apparatus 200, the trigger frame 2 instructing the cooperative transmission illustrated in FIG. 5 at time t5. In FIG. 8, the trigger frame 2 includes an instruction for aggregating the data frames 1 and 2 from time t7 and transmitting the data frames 1 and 2 to the wireless terminal 300. Therefore, since the trigger frame 2 includes the information for instructing the cooperative transmission, the trigger frame 2 may be based on the frame format of FIG. 5 or may be a frame format different from that of FIG. 5. Note that, in the cooperative transmission, since the time periods transmitted by the wireless communication apparatuses 100 and 200 at least partially match each other, the trigger frame 2 may include an instruction to transmit at a frequency position different from a transmission frequency position used by the wireless communication apparatus 100. Alternatively, when the data frames 1 and 2 transmitted by the wireless communication apparatus 100 and the wireless communication apparatus 200 have exactly the same contents, an instruction to transmit at the same frequency position may be included. Upon receiving the trigger frame 2, the wireless communication apparatus 200 reads out the data frames held in the storage unit 217 and generates the data frames 1 and 2. When data is held in the storage unit 217, the wireless communication apparatus 200 generates the data frames 1 and 2 from the held data.

At time t7, which is a time after the SIFS time has elapsed from the end of the trigger frame 2, the wireless communication apparatuses 100 and 200 transmit, to the wireless terminal 300, A-MPDU2 in which the data frames 1 and 2 are aggregated. The structure of A-MPDU2 is similar to that of A-MPDU1 and aggregates the data frames 1 and 2. The wireless terminal 300 transmits the BA frame to the wireless communication apparatus 100 at time t9, which is a time after the SIFS time has elapsed from the end of A-MPDU2. The wireless communication apparatus 100 receives this BA frame and recognizes that the wireless terminal 300 has received the data frames 1 and 2. In the case of FIG. 8, since the wireless terminal 300 has received the data frames 1 and 2, the wireless communication apparatus 100 does not retransmit the data frames 1 and 2. Note that when the wireless terminal 300 does not receive at least one of the data frames 1 and 2, the wireless communication apparatus 100 identifies the data frame. The wireless communication apparatus 100 transmits the identified data frame in cooperation with the wireless communication apparatus 200 in the same manner from time t5 to time t8.

The sequence diagrams of the wireless communication apparatuses 100, 200, and 300 in Case 1 have been described above. Hereinafter, a flowchart of the operation of the wireless communication apparatus 100 in Case 1 described with reference to FIG. 8 will be described with reference to FIGS. 10 and 11. Note that the setting of the MAC frame in the setting unit 111 is performed in advance.

The generation unit 112 generates A-MPDU1 including the trigger frame 1 and the data frames 1 and 2. A-MPDU1 is subjected to a transmission process by the modulation unit 121, is converted into an analog signal by the DAC unit 122, and is transmitted from the transmission unit 131 to the wireless communication apparatus 200 and the wireless terminal 300 via the antenna 132 (step S101). In FIG. 8, the trigger frame 1 and the data frames 1 and 2 are aggregated as A-MPDU1. A-MPDU1 is transmitted at time t1.

The reception unit 133 waits for the reception of the acknowledgement frame from the wireless communication apparatus 200 and the wireless terminal 300 via the antenna 132 (step S102). While waiting for the reception, the reception unit 133 receives the acknowledgement frame from the wireless communication apparatus 200 and the wireless terminal 300 when the acknowledgement frame is transmitted. In the present embodiment, since the BA frame is used as the acknowledgement frame, the acknowledgement frame is also referred to as a BA frame. The received BA frame is digitally converted by the ADC unit 123, the reception process is performed thereon by the demodulation unit 124, and the acknowledgement information is extracted by the analysis unit 113. The acknowledgement information is transmitted to the determination unit 114.

The control unit 115 confirms whether the reception waiting time of the BA frame has ended (step S103). During the reception waiting time (step S103: No), the control unit 115 continues the reception waiting of the BA frame (step S102). In FIG. 8, the wireless communication apparatus 100 waits for the reception of the BA frame from time t2 to time t4.

When the reception waiting time of the BA frame ends (step S103: Yes), the determination unit 114 confirms whether there is the transmission destination B from which the wireless communication apparatus 100 has not received the BA frame among the transmission destinations A of A-MPDU1 (step S104). In the present embodiment, the transmission destination A is the wireless communication apparatus 200 and the wireless terminal 300. In FIG. 8, the transmission destination B is the wireless terminal 300. The determination unit 114 can determine the transmission source of the BA frame by confirming whether the BA frame includes the identification information of the wireless communication apparatus 200 and the wireless terminal 300. As the identification information, for example, the MAC address is used. Information about the transmission source of the BA frame is set in the Address 2 field. The determination unit 114 can determine the transmission source of the BA frame to confirm the transmission destination B for which the wireless communication apparatus 100 has not received the BA frame among the transmission destinations A. Further, when the wireless communication apparatus 100 does not receive the BA frame within the reception waiting time of the BA frame, it is possible to confirm the transmission destination B that has not received the BA frame.

When the transmission destination B can be confirmed (step S104: Yes), the determination unit 114 determines that the transmission destination B has not received the data frames 1 and 2 (step S105). When the determination unit 114 cannot confirm the transmission destination B, the process proceeds to step S110. In FIG. 8, the determination unit 114 determines that the wireless terminal 300 has not received the data frames 1 and 2.

The determination unit 114 determines the data frame received by the transmission destination A and/or the data frame not received by the transmission destination A and determines retransmission of the data frame (step S110). The determination unit 114 determines whether the retransmission is required for each data frame, based on the data frame received by the transmission destination A and/or the data frame not received by the transmission destination A. Further, when the data frame is retransmitted, the determination unit 114 determines whether to perform cooperative transmission with the wireless communication apparatus 200 or whether the wireless communication apparatus 100 alone performs transmission. Details of step S110 will be described below with reference to FIG. 11.

The determination unit 114 confirms whether there is the data frame A received by the wireless terminal 300 among the data frames 1 and 2, based on the information about the BA frame of the wireless terminal 300 (step S111). The determination unit 114 confirms the data frame A by comparing the identifiers of the data frames 1 and 2 with the identifier included in the BA frame. The identifier is, for example, a sequence number. On the other hand, when the wireless communication apparatus 100 does not receive the BA frame itself from the wireless terminal 300, the determination unit 114 determines that the wireless terminal 300 has not received the data frame, and thus the data frame A can be confirmed. When there is the data frame A (step S111: Yes), the determination unit 114 determines not to retransmit the data frame A (step S112). When there is no data frame A (step S111: No), the process proceeds to step S113. In FIG. 8, since the determination unit 114 has determined that the wireless terminal 300 has not received the data frame, there is no data frame A.

Based on the information about the BA frames of the wireless communication apparatus 200 and the wireless terminal 300, the determination unit 114 confirms whether there is the data frame B not received by the wireless terminal 300 and received by the wireless communication apparatus 200 among the data frames 1 and 2 (step S113). The determination unit 114 confirms the data frame B by comparing the identifiers of the data frames 1 and 2 with the identifier included in the BA frame. Further, when the wireless communication apparatus 100 does not receive the BA frame from the wireless communication apparatus 200, the determination unit 114 determines that the wireless communication apparatus 200 has not received the data frame, and thus can confirm the data frame B. When there is the data frame B (step S113: Yes), the determination unit 114 determines to transmit the data frame B in cooperation with the wireless communication apparatus 200 (step S114). When there is no data frame B (step S113: No), the process proceeds to step S115. In FIG. 8, since the wireless communication apparatus 100 has received, from the wireless communication apparatus 200, the BA frame indicating that the data frames 1 and 2 have been received, the data frame B is the data frames 1 and 2. The determination unit 114 determines to transmit the data frames 1 and 2 in cooperation with the wireless communication apparatus 200.

Based on the information about the BA frames of the wireless communication apparatus 200 and the wireless terminal 300, the determination unit 114 confirms whether there is the data frame C not received by the wireless communication apparatus 200 and the wireless terminal 300 among the data frames 1 and 2 (step S115). The determination unit 114 confirms the data frame C by comparing the identifiers of the data frames 1 and 2 with the identifier included in the BA frame. Further, the determination unit 114 can confirm the data frame C based on the information about whether the BA frame has been received. When there is the data frame C (step S113: Yes), the determination unit 114 determines to transmit the data frame C by the wireless communication apparatus 100 alone (step S116), and step S110 ends. When there is no data frame C (step S115: No), step S110 ends. In FIG. 8, since the wireless communication apparatus 100 receives, from the wireless communication apparatus 200, the BA frame indicating that the data frames 1 and 2 have been received, there is no data frame C.

Returning to FIG. 10, the control unit 115 determines whether to retransmit or transmit the data frame based on the determination result of step S110 (step S106). When the cooperative transmission of the wireless communnication apparatuses 100 and 200 is performed, or when the wireless communication apparatus 100 alone performs retransmission, the control unit 115 determines to retransmit or transmit the data frame (Step S106: Yes). In this case, the control unit 115 instructs to generate and transmit a frame related to the data frame to be retransmitted (step S107). The frame related to the data frame to be retransmitted includes the data frame to be retransmitted and the trigger frame 2 in the case of cooperative transmission with the wireless communication apparatus 200. In FIG. 8, since the wireless communication apparatus 100 transmits the data frames 1 and 2 in cooperation with the wireless communication apparatus 200, the trigger frame 2 is transmitted to the wireless communication apparatus 200 at time t. The trigger frame 2 includes instructions for the transmission of the data frames 1 and 2 to the wireless terminal 300, the timing for starting the transmission of the data frames 1 and 2, and the frequency band used for the transmission, the position of the RU, and the like. The wireless communication apparatuses 100 and 200 cooperatively transmit the data frames 1 and 2 to the wireless terminal. 300 from time t7 after the SIFS has elapsed from the end of the trigger frame 2. In the present embodiment, the cooperation transmission of the wireless communication apparatuses 100 and 200 is performed by frequency multiplexing, which performs transmission at different frequencies (for example, different RU positions). In this manner, it is possible to perform transmission even when the transmission time periods at least partially overlap each other. On the other hand, when the data frames 1 and 2 transmitted by the wireless communication apparatus 100 and the data frames 1 and 2 transmitted by the wireless communication apparatus 200 are the same wireless signal (the contents are the same as the MAC frame, the physical rates are the same, etc.), the transmission may be performed at the same frequency position.

After the data frame is retransmitted, the process returns to step S102. After that, the wireless communication apparatus 100 repeats the series of steps described in steps S102 to S105, S110, S106, and S107 until the data frames 1 and 2 become the data frame A described in step S111. When the determination unit 114 determines not to retransmit all the data frames (step S106: No), the process proceeds to step S108.

The control unit 115 confirms whether the end instruction for ending the operation of the wireless communication apparatus 100 has arrived (step S108). The end instruction is an instruction to end the operation of the wireless communication apparatus 100 in this flow. The end instruction is transmitted to the control unit 115 in such a manner that the user inputs the end instruction to the wireless communication apparatus 100, or the wireless communication apparatus 100 acquires a signal including the end instruction. The end instruction may be an instruction that immediately ends the operation of the wireless communication apparatus 100.

When the end instruction has not arrived at the control unit 115 (step S108: No), the process returns to step S101. On the other hand, when the end instruction has arrived at the control unit 115 (step S108: Yes), the flow ends and the wireless communication apparatus 100 ends the operation.

The wireless communication apparatus 100 according to the present embodiment has been described above. Hereinafter, a plurality of cases other than Case 1 will be described using Table 1 and FIGS. 12 to 16. Table 1 shows data frames received by the wireless communication apparatus 200 and the wireless terminal 300 and the retransmission determination of the wireless communication apparatus 100, which are determined based on the information about the BA frames from the wireless communication apparatus 200 and the wireless terminal 300. In the case of the data frame 1 and the data frame 2, 16 patterns can be considered as shown in Table 1, but they are classified into 6 cases. Case 1 described above corresponds to Case No. 1. Hereinafter, Cases 2 to 6 will be described focusing on the difference from Case 1.

TABLE 1

| | BA frame reception state of wireless communication apparatus 100 (information about BA frame) | | Reception state of wireless communication apparatus 200 and wireless terminal 300 based on information about BA frame | | Retransmission | |
| --- | --- | --- | --- | --- | --- | --- |
| No. | Success or failure of BA reception from wireless communication apparatus 200 | Success or failure of BA reception from wireless terminal 300 | Data received by wireless communication apparatus 200 | Data received by wireless terminal 300 | determination of wireless communication apparatus 100 | Corresponding sequence diagram |
| 1 | Received (○) | Not received (×) | Data 1, Data 2 | — | Transmit Data 1 and Data 2 in cooperation with wireless communication apparatus 200 | Case 1 |
| 2 | | | Data 1 | — | Transmit Data 1 in cooperation with wireless communication apparatus 200 Transmit Data 2 alone | Case 2 |

TABLE 1-continued

| | BA frame reception state of wireless communication apparatus 100 (information about BA frame) | | Reception state of wireless communication apparatus 200 and wireless terminal 300 based on information about BA frame | | Retransmission | |
|---|---|---|---|---|---|---|
| No. | Success or failure of BA reception from wireless communication apparatus 200 | Success or failure of BA reception from wireless terminal 300 | Data received by wireless communication apparatus 200 | Data received by wireless terminal 300 | determination of wireless communication apparatus 100 | Corresponding sequence diagram |
| 3 | | | Data 2 | — | Transmit Data 1 alone Transmit Data 2 in cooperation with wireless communication apparatus 200 | Same as Case 2 |
| 4 | Not received (x) | Received (o) | — | Data 1, Data 2 | Not necessary to transmit Data 1 and Data 2 | Case 3 |
| 5 | | | — | Data 1 | Transmit Data 2 alone | Case 4 |
| 6 | | | — | Data 2 | Transmit Data 1 alone | Same as Case 4 |
| 7 | Not received (x) | Not received (x) | — | — | Transmit Data 1 and Data 2 alone | Case 6 |
| 8 | Received (o) | Received (o) | Data 1, Data 2 | Data 1, Data 2 | Not necessary to transmit Data 1 and Data 2 | Same as Case 3 |
| 9 | | | | Data 1 | Transmit Data 2 in cooperation with wireless communication apparatus 200 | Same as Case 5 |
| 10 | | | | Data 2 | Transmit Data 1 in cooperation with wireless communication apparatus 200 | Same as Case 5 |
| 11 | | | Data 1 | Data 1, Data 2 | Not necessary to transmit Data 1 and Data 2 | Same as Case 3 |
| 12 | | | | Data 1 | Transmit Data 2 alone | Same as Case 4 |
| 13 | | | | Data 2 | Transmit Data 1 in cooperation with wireless communication apparatus 200 | Same as Case 5 |
| 14 | Received (o) | Received (o) | Data 2 | Data 1, Data 2 | Not necessary to transmit Data 1 and Data 2 | Same as Case 3 |
| 15 | | | | Data 1 | Transmit Data 2 in cooperation with wireless communication apparatus 200 | Same as Case 5 |
| 16 | | | | Data 2 | Transmit Data 1 alone | Same as Case 4 |

Figure 12:
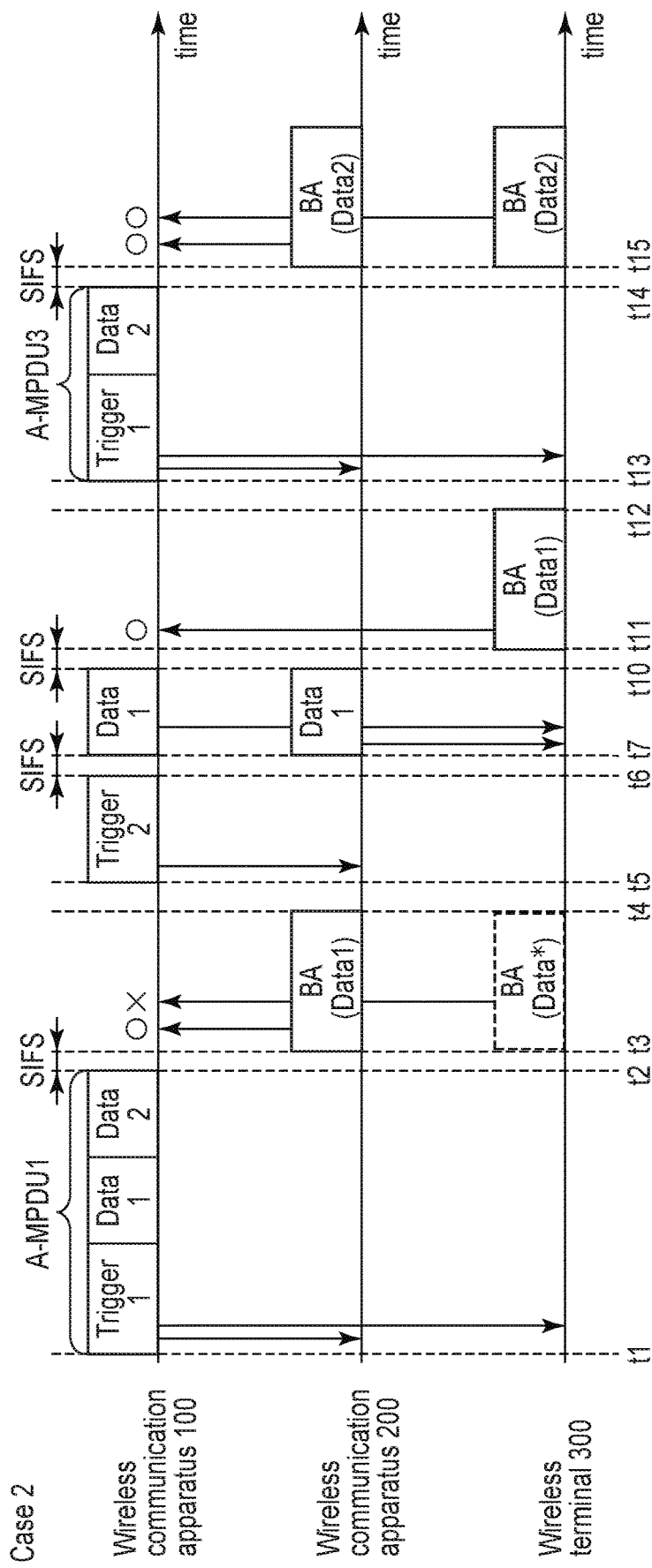
FIG. 12 is a sequence diagram of Case 2.

FIG. 12 is a sequence diagram of the wireless communication apparatuses 100 and 200 and the wireless terminal 300 in Case 2. FIG. 12 shows a sequence diagram of No. 2 in Table 1. Case 2 is the same as Case 1 until the wireless communication apparatus 100 transmits A-MPDU1 and receives the BA frames from the wireless communication apparatus 200 and the wireless terminal 300. A difference between Case 2 and Case 1 is that the wireless communication apparatus 200 receives the data frame 1 and does not receive the data frame 2. In this case, the determination unit 114 determines in step S114 to transmit the data frame 1 in cooperation with the wireless communication apparatus 200 and determines in step S116 to transmit the data frame 2 by the wireless communication apparatus 100 alone.

The wireless communication apparatus 100 generates a trigger frame 2 including an instruction required for cooperative transmission of the data frame 1 at time t5, and transmits the trigger frame 2 to the wireless communication apparatus 200. The instruction included in the trigger frame 2 is the same as the instruction described in Case 1, except that the target of cooperative transmission is only the data frame 1. The wireless communication apparatuses 100 and 200 cooperatively transmit the data frame 1 to the wireless terminal 300 at time t7, which is a time after the SIFS time has elapsed from the end of the trigger frame 2. The wireless communication apparatus 100 receives the BA frame from the wireless terminal 300. In FIG. 12, the wireless terminal 300 receives the data frame 1, but when the wireless terminal 300 has not received the data frame 1, the cooperative transmission of the wireless communication apparatuses 100 and 200 is performed again.

The wireless communication apparatus 100 recognizes that the data frame 1 is received by the wireless terminal 300, based on the BA frame from the wireless terminal 300. The wireless communication apparatus 100 generates A-MPDU3 in which the data frame 2 not received by the wireless communication apparatus 200 and the wireless terminal 300 is aggregated with the trigger frame 1, and transmits A-MPDU3. The wireless communication apparatus 100 receives BA frames from the wireless communication apparatus 200 and the wireless terminal 300. In FIG. 12, the wireless communication apparatus 200 and the wireless terminal 300 receive the data frame 2. Note that, when only the wireless communication apparatus 200 receives the data frame 2, cooperative transmission of the data frame 2 by the wireless communication apparatus 100 and the wireless communication apparatus 200 is performed in the same manner as the case described at times t5 to t12. When only the wireless terminal 300 receives the data frame 2, the data frame 2 is not retransmitted.

Case 2 has been described above. Also in No. 3 of Table 1, the data frame 1 and the data frame 2 are only replaced, and it is the same as Case 2.

Figure 13:
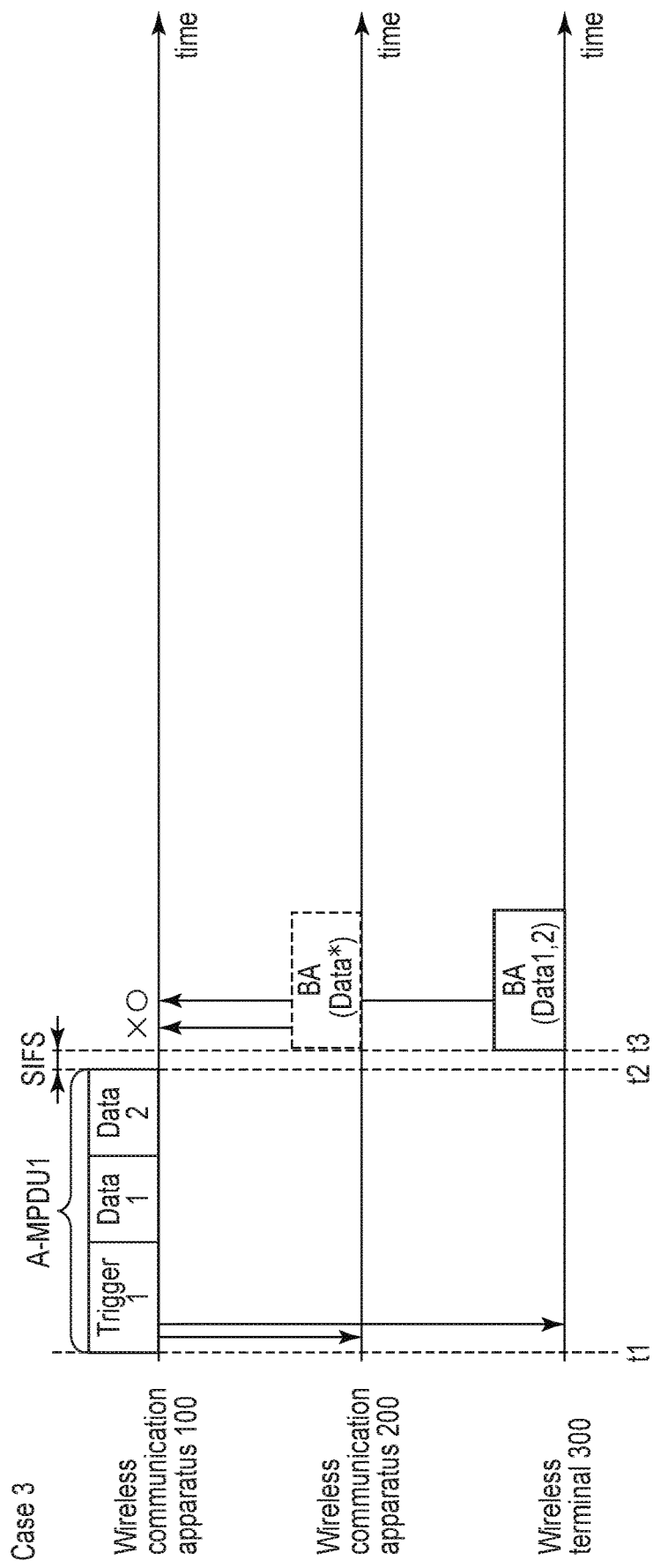
FIG. 13 is a sequence diagram of Case 3.

FIG. 13 is a sequence diagram of the wireless communication apparatuses 100 and 200 and the wireless terminal 300 in Case 3. FIG. 13 illustrates a sequence diagram of No. 4 in Table 1. Case 3 is the same as Case 1 until the wireless communication apparatus 100 transmits A-MPDU1 and receives the BA frames from the wireless communication apparatus 200 and the wireless terminal 300. A difference between Case 3 and Case 1 is that the wireless communication apparatus 200 does not receive the data frames 1 and 2 and the wireless terminal 300 receives the data frames 1 and 2. In this case, the determination unit 114 determines in step S112 not to retransmit the data frames 1 and 2. In Case 3, it suffices if the wireless terminal 300 receives the data frames 1 and 2. Similarly, in No. 8, No. 11, and No. 14 of Table 1, the determination unit 114 determines in step S112 not to retransmit the data frames 1 and 2.

Figure 14:
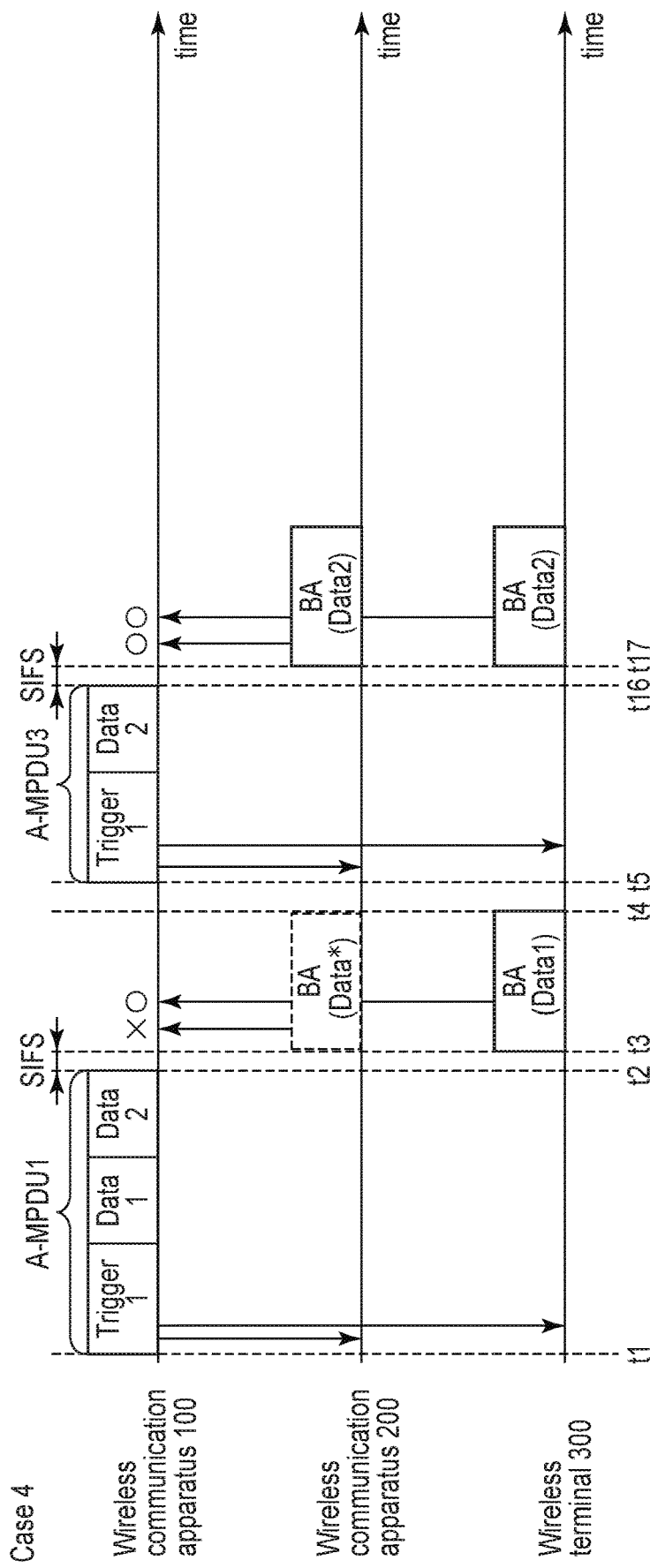
FIG. 14 is a sequence diagram of Case 4.

FIG. 14 is a sequence diagram of the wireless communication apparatuses 100 and 200 and the wireless terminal 300 in Case 4. FIG. 14 illustrates a sequence diagram of No. 5 in Table 1. Case 4 is the same as Case 3 until the wireless communication apparatus 100 transmits A-MPDU1 and receives the BA frames from the wireless communication apparatus 200 and the wireless terminal 300. A difference between Case 4 and Case 3 is that the wireless terminal 300 receives the data frame 1 and does not receive the data frame 2. In this case, the determination unit 114 determines in step S112 not to retransmit the data frame 1, and determines in step S116 to transmit the data frame 2 by the wireless communication apparatus 100 alone.

The wireless communication apparatus 100 generates A-MPDU3 in which the data frame 2 not received by the wireless communication apparatus 200 and the wireless terminal. 300 is aggregated with the trigger frame 1, and transmits A-MPDU3. The wireless communication apparatus 100 receives BA frames from the wireless communication apparatus 200 and the wireless terminal 300. In FIG. 12, the wireless communication apparatus 200 and the wireless terminal 300 receive the data frame 2. Note that, when only the wireless communication apparatus 200 receives the data frame 2, cooperative transmission of the wireless communication apparatus 100 and the wireless communication apparatus 200 is performed in the same manner as times t5 to t12 of Case 2. When only the wireless terminal 300 receives the data frame 2, the data frame 2 is not retransmitted. In Case 4, the data frame not received by the wireless communication apparatus 200 and the wireless terminal 300 is retransmitted by the wireless communication apparatus 100 alone. Also in No. 6, No. 12, and No. 16 of Table 1, the data frame 1 and the data frame 2 are only replaced, and it is the same as Case 4.

Figure 15:
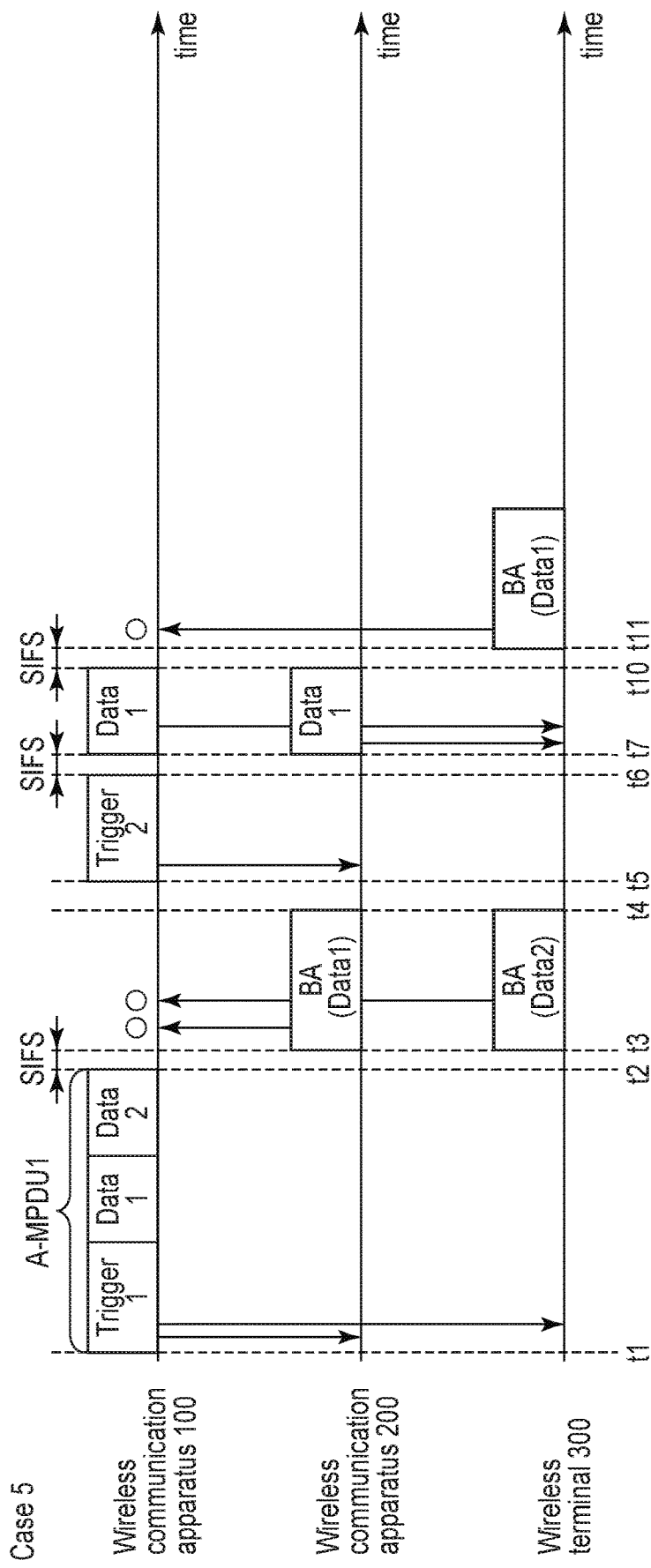
FIG. 15 is a sequence diagram of Case 5.

FIG. 15 is a sequence diagram of the wireless communication apparatuses 100 and 200 and the wireless terminal 300 in Case 5. FIG. 15 illustrates a sequence diagram of No. 13 in Table 1. Case 5 is the same as Case 1 until the wireless communication apparatus 100 transmits A-MPDU1 and receives the BA frames from the wireless communication apparatus 200 and the wireless terminal 300. A difference between Case 5 and Case 1 is that the wireless communication apparatus 200 receives the data frame 1 and has not received the data frame 2, and the wireless terminal 300 receives the data frame 2 and has not received the data frame 1. In this case, the determination unit 114 determines in step S112 not to retransmit the data frame 2, and determines in step S114 to transmit the data frame 1 in cooperation with the wireless communication apparatus 200. Thereafter, as in Case 2, the data frame 1 is cooperatively transmitted. As in No. 10 of Table 1, the data frame 1 is cooperatively transmitted. As a variation similar to Case 5, when the wireless communication apparatus 200 receives the data frame 2 and the wireless terminal 300 receives the data frame 1, the determination unit 114 determines in step S112 not to retransmit the data frame 1, and determines in step S114 to transmit the data frame 2 in cooperation with the wireless communication apparatus 200. Thereafter, as in Case 2, the data frame 2 is cooperatively transmitted. As in No. 9 and No. 15 of Table 1, the data frame 2 is cooperatively transmitted.

Figure 16:
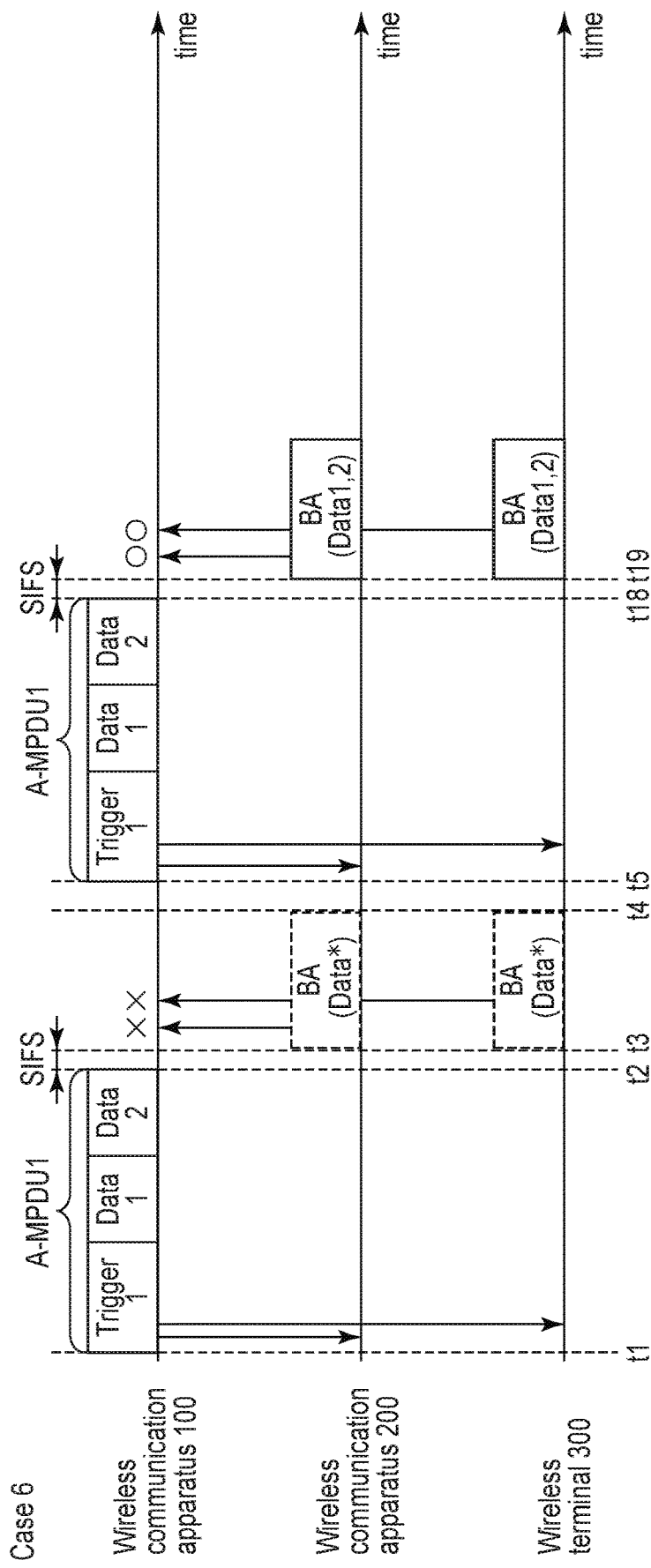
FIG. 16 is a sequence diagram of Case 6.

FIG. 16 is a sequence diagram of the wireless communication apparatuses 100 and 200 and the wireless terminal 300 in Case 6. FIG. 16 illustrates a sequence diagram of No. 7 in Table 1. Case 6 is the same as Case 1 until the wireless communication apparatus 100 transmits A-MPDU1 and receives the BA frames from the wireless communication apparatus 200 and the wireless terminal 300. A difference between Case 6 and Case 1 is that the wireless communication apparatus 200 and the wireless terminal 300 have not received the data frames 1 and 2. In this case, the determination unit 114 determines in step S116 to transmit the data frames 1 and 2 by the wireless communication apparatus 100 alone. That is, the process is restarted from the transmission of A-MPDU1 from time t1. In FIG. 16, although A-MPDU1 transmitted at time t5 is received by the wireless communication apparatus 200 and the wireless terminal 300, Cases 1 to 5 are the same depending on the reception states of the data frames 1 and 2 in the wireless communication apparatus 200 and the wireless terminal 300.

Cases 1 to 6 have been described above. The wireless communication apparatus 100 described in the present embodiment is an example, and various modifications can be implemented and executed. Modifications of the present embodiment will be described below.

(Modification 1: Modification of A-MPDU1)

In the present embodiment, regarding the destination of A-MPDU1, it has been described that the trigger frame 1 is for the group, the data frame 1 is for the wireless communication apparatus 200 and the wireless terminal 300, and the data frame 2 is for the wireless communication apparatus 200 and the wireless terminal 300. The destination of each MAC frame aggregated in A-MPDU1 is not limited to the present embodiment. For example, the destinations in Table 2 can be considered.

TABLE 2

| | Trigger1_1 | | | Data1_1 | | Data2_1 | |
|---|---|---|---|---|---|---|---|
| No. | Address1 | User Info1 | User Info2 | Address1 | Sequence | Address1 | Sequence |
| 1 | Group | Wireless terminal 300 | Wireless communication apparatus 200 | Wireless terminal 300 | 1 | Wireless terminal 300 | 2 |
| 2 | Wireless terminal 300 | Wireless terminal 300 | — | Wireless terminal 300 | 1 | Wireless terminal 300 | 2 |

TABLE 2-continued

| No. | | | | | | | |
|---|---|---|---|---|---|---|---|
| 3 | Group | Wireless terminal 300 | Wireless communication apparatus 200 | Wireless terminal 300 | 1 | Wireless terminal 300 | 2 |
| 4 | Group | Wireless terminal 300 | Wireless communication apparatus 200 | Group | 1 | Group | 2 |
| 5 | Group | Wireless terminal 300 | Wireless communication apparatus 200 | Common | 1 | Common | 2 |
| 6 | Group | Wireless communication apparatus 200 | Wireless terminal 300 | Wireless communication apparatus 200 | 1 | Wireless communication apparatus 200 | 2 |
| 7 | Wireless terminal 300 | Wireless terminal 300 | — | Group | 1 | Group | 2 |

| | Trigger1_2 | | Data1_2 | | Data2_2 | |
|---|---|---|---|---|---|---|
| No. | Address1 | User Info1 | Address1 | Sequence | Address1 | Sequence |
| 1 | — | — | Wireless communication apparatus 200 | 1 | Wireless communication apparatus 200 | 2 |
| 2 | Wireless communication apparatus 200 | Wireless communication apparatus 200 | Wireless communicaton apparatus 200 | 1 | Wireless communication apparatus 200 | 2 |
| 3 | — | — | — | — | — | — |
| 4 | — | — | — | — | — | — |
| 5 | — | — | — | — | — | — |
| 6 | — | — | — | — | — | — |
| 7 | Wireless communication apparatus 200 | Wireless communication apparatus 200 | — | — | — | — |

In the present embodiment, No. 1 of Table 2 has been described. In Table 2, Trigger1_1 represents the first trigger frame 1 in A-MPDU1, Trigger1_2 represents the second trigger frame 1 in A-MPDU1, Data1_1 represents the first data frame 1 in A-MPDU1, Data1_2 represents the second data frame 1 in A-MPDU1, Data2_1 represents the first data frame 2 in A-MPDU1, and Data2_2 represents the second data frame 2 in A-MPDU1. Note that, in the present embodiment (No. 1), the destination of the first trigger frame 1 is the address of the group, and thus the second trigger frame 1 is not required.

The trigger frame 1 includes a destination (Address 1) and an instruction (User Info 1, User Info 2) for each wireless communication apparatus 200 or wireless terminal 300. For example, in No. 1, since the destination of the trigger frame 1 is the address of the group, that is, the wireless communication apparatus 200 and the wireless terminal 300, an instruction to the wireless terminal 300 is set in User info 1 and an instruction to the wireless communication apparatus 200 is set in User Info 2. Note that the MAC address, the AID, or the like is used for the identification information of the wireless communication apparatus 200 and the wireless terminal 300 set in Address 1, User Info 1, and User Info 2.

A destination (Address 1) and a sequence number (Sequence) are set in the data frames 1 and 2. For example, in No. 1, the destinations of the first data frame 1 (Data1_1) and the first data frame 2 (Data2_1) are set in the wireless terminal 300, and the sequence numbers are set to 1 and 2, respectively. In Table 2, although the sequence number 1 is set in the data frame 1 and the sequence number 2 is set in the data frame 2, the sequence numbers 1 and 2 may be changed according to the destination. That is, when an agreement regarding the sequence number is made between the wireless communication apparatus 100 and the destination, the sequence number according to the destination may be set in the data frames 1 and 2.

The overview of Nos. 2 to 7 in Table 2 will be described below. No. 2 represents a case in which there are two sets of the trigger frame 1, the data frame 1, and the data frame 2, and the destinations thereof are the wireless communication apparatus 200 and the wireless terminal 300, respectively. In No. 3, the destination of the trigger frame 1 is the address of the group, and the destinations of the data frames 1 and 2 are the wireless terminal 300. The instruction to the wireless communication apparatus 200 included in the trigger frame 1 includes an instruction to receive and transmit the BA frame even when the destination is the wireless terminal 300. No. 4 is a case in which the destinations of the trigger frame 1, the data frame 1, and the data frame 2 are set to the address of the group. In the trigger frame 1, the wireless communication apparatus 200 and the wireless terminal 300 each include an instruction to transmit the BA frame. No. 5 is a case in which the destination of the trigger frame 1 is the address of the group and the destinations of the data frames 1 and 2 are set to a common address (Common). The common address is a unicast MAC address that is common to the wireless communication apparatus 200 and the wireless terminal 300. The common address is pre-arranged between the wireless communication apparatuses 100 and 200 and the wireless terminal 300. In No. 6, the destination of the trigger frame 1 is the address of the group, and the destinations of the data frames 1 and 2 are the wireless communication apparatus 200. The instruction to the wireless terminal 300 included in the trigger frame 1 includes an instruction to receive and transmit the BA frame even when the destination is the wireless communication apparatus 200. No. 7 is a case in which there are two trigger frames 1, the destination and the instruction target of which are of the wireless communication apparatus 200 and the wireless terminal 300, respectively, and the destinations of the data frames 1 and 2 are set to the address of the group. Instructions are given to the wireless communication apparatus 200 and the wireless terminal 300 by the two trigger frames 1, and the wireless communication apparatus 200 and the wireless terminal 300 receive the data frames 1 and 2, respectively.

As described above, the trigger frame 1 and the data frames 1 and 2 of A-MPDU1 transmitted by the wireless communication apparatus 100 can be variously set.

(Modification 2: Modification of Cooperative Transmission)

Figure 17:
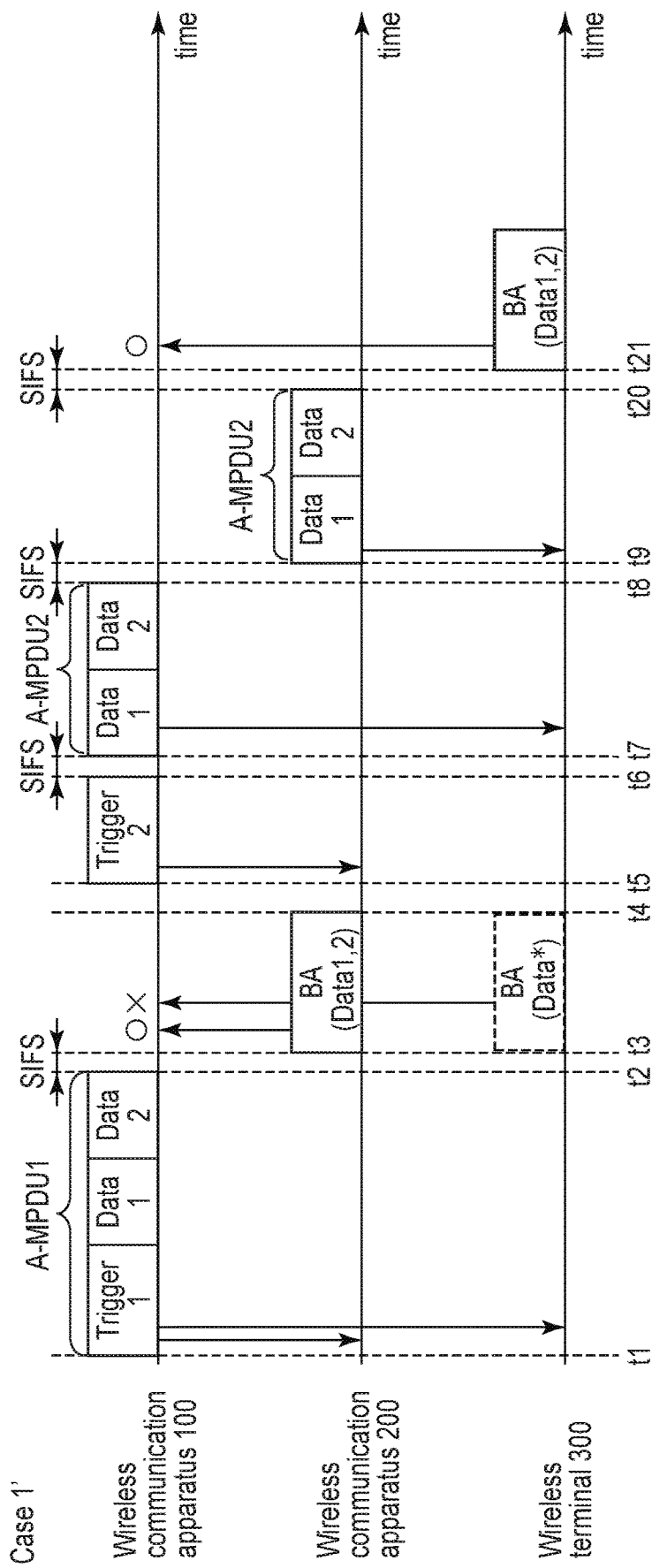
FIG. 17 is a sequence diagram of Case 1' that is a modification of Case 1.

Regarding cooperative transmission, in the present embodiment, the case in which the transmission time periods of the wireless communication apparatuses 100 and 200 at least partially overlap each other has been described. The transmission time periods of the wireless communication apparatuses 100 and 200 may be aligned with a certain waiting time. The certain waiting time may be determined based on, for example, the waiting time specified in the IEEE 802.11 standard, such as the SIFS time. Even in this case, it is included in the cooperative transmission of the wireless communication apparatuses 100 and 200. In FIG. 17, Case 1' represents a case in which the transmission time periods of the wireless communication apparatuses 100 and 200 do not overlap each other in Case 1 of FIG. 8. In Case 1', the trigger frame 2 includes an instruction to transmit A-MPDU2 after SIFS time from the end of A-MPDU2 transmitted by the wireless communication apparatus 100. In FIG. 17, at time t9, which is a time after the SIFS time has elapsed from the end of A-MPDU2 transmitted by the wireless communication apparatus 100, the wireless communication apparatus 200 transmits A-MPDU2 to the wireless terminal 300. Note that, when the transmission time periods of the wireless communication apparatuses 100 and 200 are aligned with a certain waiting time, the transmission frequency position of the wireless communication apparatus 100 and the transmission frequency position of the wireless communication apparatus 200 may be the identical to or different from each other.

(Modification 3: Modification of Operation)

Figure 10:
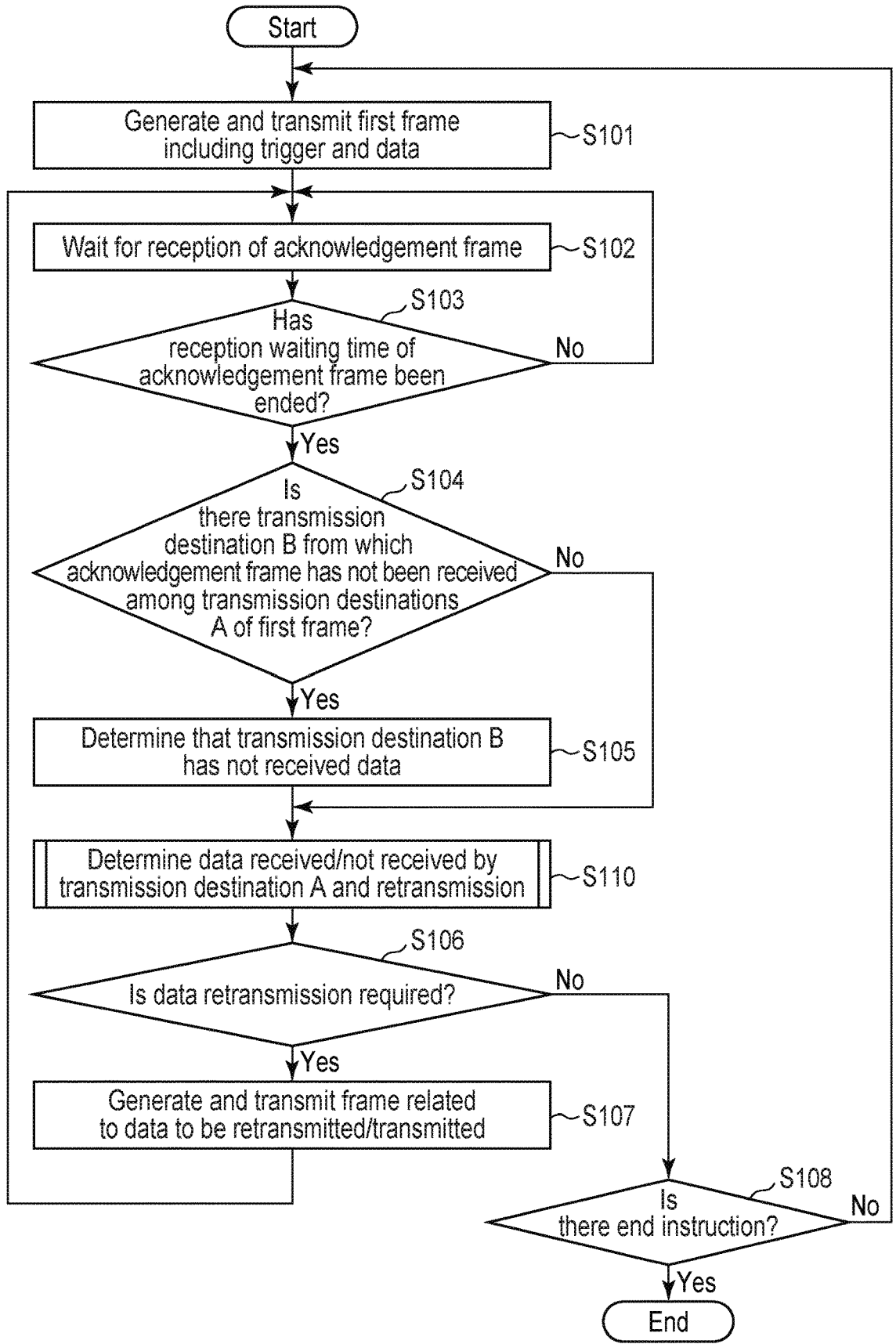
FIG. 10 is a flowchart of the operation of the wireless communication apparatus 100.

In the present embodiment, the operation of the wireless communication apparatus 100 has been described based on the flowcharts of FIGS. 10 and 11, but the following modification may be used as appropriate.

In step S101, the wireless communication apparatus 100 transmits A-MPDU1 in which the trigger frame 1 and the data frames 1 and 2 are aggregated, but the aggregation is not necessarily required. The wireless communication apparatus 100 may transmit the trigger frame 1 and the data frames 1 and 2 or may collectively transmit a part thereof. Similarly, in step S107, the wireless communication apparatuses 100 and 200 do not necessarily aggregate the frames into A-MPDU2 and A-MPDU3 and transmit them.

In step S103, the control unit 115 continues to receive the acknowledgement frame only for a preset time. When the reception of the BA frames from the wireless communication apparatus 200 and the wireless terminal 300 is completed, step S103 may be ended even when the preset time has not elapsed. The end of the reception of the BA frames may be notified from, for example, the demodulation unit 124 or the analysis unit 113.

Each step of FIGS. 10 and 11 may be partially replaced. For example, in the sets of steps S111 and S112, steps S113 and S114, and steps S115 and S116, the order of these sets may be interchanged.

In step S107, when the wireless communication apparatus 100 alone performs transmission, the transmission destinations are both the wireless communication apparatus 200 and the wireless terminal 300, but the transmission may be performed only to the wireless terminal 300. Depending on the state of communication between the wireless communication apparatuses 100 and 200 and the wireless terminal 300, the wireless communication apparatus 100 may not perform cooperative transmission with the wireless communication apparatus 200, but may perform single transmission.

(Modification 4: When there are a Plurality of Wireless Communication Apparatuses 200 and Wireless Terminals 300)

Figure 18:
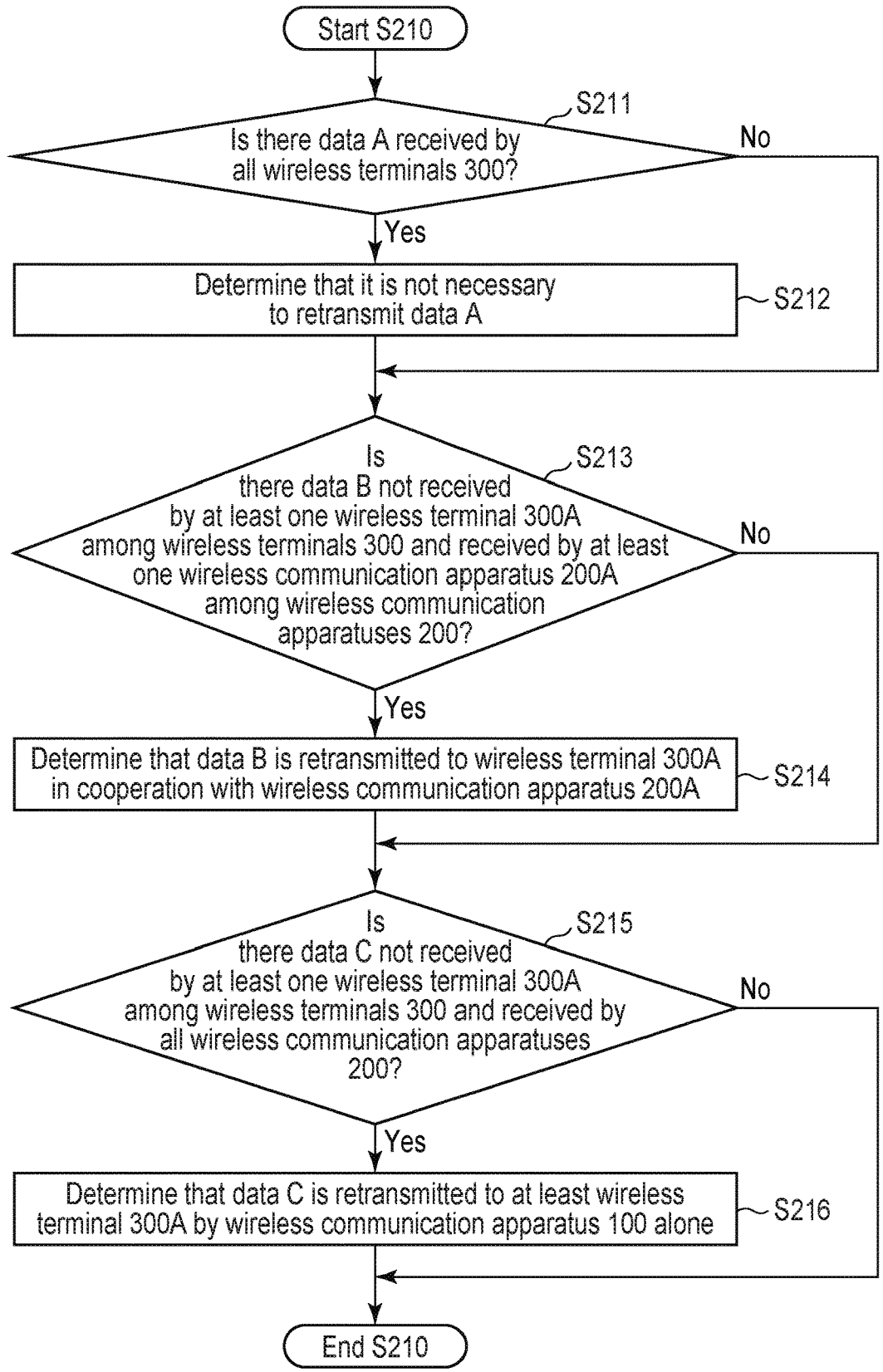
FIG. 18 is a flowchart of step S210 that is a modification of step S110.

The wireless communication apparatus 100 described in the present embodiment is applicable even when there are a plurality of wireless communication apparatuses 200 and wireless terminals 300. Step S110 may be step S210 described with reference to FIG. 18. Hereinafter, step S210 will be described focusing on the difference from step S110. Since the description of the present embodiment can be applied to the other steps, the description thereof will be omitted.

In step S211, the determination unit 114 sets data frames received by all the wireless terminals 300 as a data frame A. The determination unit 114 determines not to retransmit the data frame A (step S212).

In step S213, the determination unit 114 sets, as a data frame B, a data frame not received by at least one wireless terminal 300A among the wireless terminals 300 and received by at least one wireless communication apparatus 200A among the wireless communication apparatuses 200. The determination unit 114 determines to transmit the data frame B in cooperation with the wireless communication apparatus 200A (step S214). The data frame B may be different in the wireless communication apparatus 200A that performs cooperative transmission for each data frame and the wireless terminal 300A that is the transmission destination. For example, in the case of the data frame B1, the wireless communication apparatus 100 performs cooperative transmission with a wireless communication apparatus 200A1 and a wireless terminal 300A1 is a transmission destination, and in the case of the data frame B2, the wireless communication apparatus 100 performs cooperative transmission with a wireless communication apparatus 200A2 and a wireless terminal 300A2 is a transmission destination.

In step S215, the determination unit 114 sets, as a data frame C, a data frame not received by at least one wireless terminal 300A among the wireless terminals 300 and not received by all the wireless communication apparatuses 200. The determination unit 114 determines to retransmit the data frame C by the wireless communication apparatus 100 alone. The determination unit 114 retransmits the data frame C to at least the wireless terminal 300A, but may or may not perform retransmission to at least one wireless communication apparatus 200.

As described above, the wireless communication apparatus 100 according to the present embodiment can be operated even when there are the plurality of wireless communication apparatuses 200 and wireless terminals 300.

(Modification 5: Modification of Wireless Communication Device 200)

A wireless communication apparatus 200 according to the present embodiment holds a data frame transmitted from a wireless communication apparatus 100 in a storage unit 217. A processing unit 210 of the wireless communication apparatus 200 may include an organization unit 214 that organizes the held data frames. FIG. 19 illustrates a configuration diagram of the wireless communication apparatus 250 in which the wireless communication apparatus 200 further includes the organization unit 214. The organization unit 214 may delete at least a part of the data frame held in the storage unit 217 according to a trigger frame from the wireless communication apparatus 100, the capacity of the storage unit 217, the time, and the like. The capacity of the storage unit 217 required for cooperative transmission can be secured by deleting the data frame held in the storage unit 217. Among the components of the wireless communication apparatus 250, the same components as those of the wireless communication apparatus 200 are denoted by the same reference numerals, and description thereof will be omitted.

Hereinafter, an example of the data frame organizing method performed by the organization unit 214 will be described. A case in which the data frame is held in the storage unit 217 will be described, but the same operation can be performed even when data extracted from the data frame is held in the storage unit 217.

The organization unit 214 may delete the data frame held in the storage unit 217 according to the free space of the storage unit 217. For example, information about the current free space is transmitted from the storage unit 217 to the organization unit 214. The information indicating the total capacity and the used capacity of the storage unit 217 may be transmitted from the storage unit 217 to the organization unit 214, in addition to the information indicating the free space of the storage unit 217. A threshold value for the free space of the storage unit 217 is set in the organization unit 214 in advance. When the free space of the storage unit 217 is less than the threshold value, the organization unit 214 deletes the data frame held in the storage unit 217. The data frame deleted by the organization unit 214 is unlikely to be cooperatively transmitted, and various determination methods can be considered. The time held in the storage unit 217 may be deleted in ascending order, and the data frame may be divided into a plurality of categories according to the time held in the storage unit 217 and at least a part of the data frame included in the certain category may be deleted.

The organization unit 214 may delete the data frame according to the time after the data frame is held in the storage unit 217. This is because as the time after the data frame is held in the storage unit 217 is longer, the possibility of cooperative transmission is further reduced. For example, information about the current time is transmitted from the measurement unit 216 to the organization unit 214. A threshold value of the time for holding the data frame in the storage unit 217 is provided to the organization unit 214 in advance. The organization unit 214 deletes, from the data frames held in the storage unit 217, the data frame of which the time from the held time to the current time is equal to or greater than the threshold value. The deletion of the data frame performed by the organization unit 214 according to the time may be performed at a certain time interval or may be an instruction from the outside.

The organization unit 214 may delete the data frame held in the storage unit 217 according to the instruction included in the trigger frame transmitted from the wireless communication apparatus 100. For example, the analysis unit 213 transmits, to the organization unit 214, the instruction related to the organization of the data frames included in the trigger frame. The organization unit 214 deletes the data frame held in the storage unit 217, based on the instruction related to the organization of the data frame. For example, an identifier of a data frame that does not need to be held may be represented as the instruction related to the organization of data frames. The organization unit 214 deletes, from the storage unit 217, the data frame that does not need to be held. Further, an identifier of a data frame to be cooperatively transmitted may be represented as the instruction related to the organization of the data frame. The organization unit 214 deletes, from the data frames held in the storage unit 217, data frames other than the data frame to be cooperatively transmitted. Note that, as the instruction related to the organization of the data frames, whether to represent the identifier of the data frame that does not need to be held and whether to represent the identifier of the data frame to be cooperatively transmitted is determined in advance between the wireless communication apparatuses 100 and 250.

As described above, the wireless communication apparatus 250 deletes at least a part of the data frame held in the storage unit 217 according to the trigger frame from the wireless communication apparatus 100, the capacity of the storage unit 217, the time, and the like. The wireless communication apparatus 250 can secure the capacity of the storage unit 217 required for future cooperative transmission by deleting the data frame that is likely to be unnecessary for cooperative transmission.

(Modification 6: Modification of Cooperative Transmission)

Figure 20:
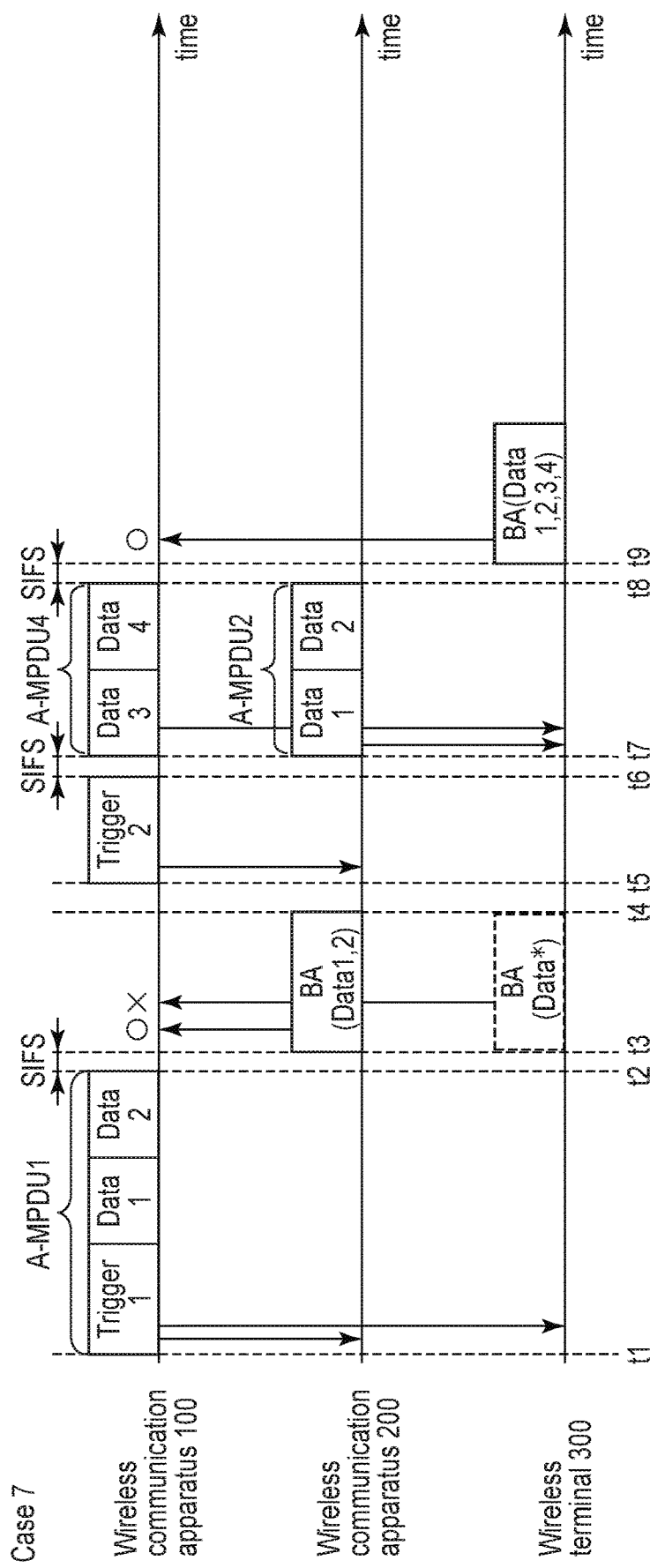
FIG. 20 is a sequence diagram of Case 7.

For cooperative transmission, in the present embodiment, when the wireless communication apparatuses 100 and 200 perform cooperative transmission, the case in which the wireless communication apparatus 100 retransmits the data frame that has not been received by the wireless terminal 300 has been described. The wireless communication apparatus 100 may transmit, to the wireless terminal 300, the data frame different from the data frame transmitted by the wireless communication apparatus 200. A frame sequence for transmitting a new data frame is illustrated in FIG. 20. In FIG. 20, Case 7 represents a case in which the wireless communication apparatus 100 transmits A-MPDU4 to the wireless terminal 300 at time t7, which is a time after the SIFS time has elapsed from the end of the trigger frame 2 in Case 1 of FIG. 8. Here, A-MPDU4 includes at least one data frame different from the data frame transmitted by the wireless communication apparatus 200. In FIG. 20, data frames 3 and 4 different from the data frames 1 and 2 are included. The new data frames are arbitrary, but may be data frames corresponding to the previously transmitted data frames. For example, when the data frames 1 to 4 include a series of data, the data frames 3 and 4 included in A-MPDU4 may be the data frames corresponding to the data frames 1 and 2. The data included in the data frames 1 to 4 may not be associated with each other.

Further, when the wireless communication apparatuses 100 and 200 perform cooperative transmission, the wireless communication apparatus 100 may transmit the data frame 1 and the wireless communication apparatus 200 may transmit the data frame 2. In FIG. 21, Case 7' represents a case in which, from time t7, which is a time after the SIFS time has elapsed from the end of the trigger frame 2, the wireless communication apparatus 100 transmits the data frame 2 and the wireless communication apparatus 200 performs cooperative transmission by transmitting the data frame 1 in Case 1 of FIG. 8. In FIG. 21, the wireless communication apparatus 200 receives the data frames 1 and 2, but the number thereof may be one. For example, when the wireless communication apparatus 200 receives the data frame 2, the wireless communication apparatus 100 may transmit the data frame 1 and the wireless communication apparatus 200 may perform cooperative transmission by transmitting the data frame 2. When the wireless communication apparatus 200 receives the data frame 1, the wireless communication apparatus 100 may transmit the data frame 2 and the wireless communication apparatus 200 may perform cooperative transmission by transmitting the data frame 1. Note that the instruction for the wireless communication apparatus 200 to transmit the data frame is included in the trigger frame 2.

Alternatively, the wireless communication apparatus 100 transmits a data frame 1-1 that is a part of the data frame 1 and a data frame 2-1 that is a part of the data frame 2, and the wireless communication apparatus 200 may transmit, to the wireless terminal 300, a data frame 1-2 that is another part of the data frame 1 and a data frame 2-2 that is another part of the data frame 2 (not illustrated). In this case, the wireless terminal 300 can generate the data frame 1 by receiving both the data frames 1-1 and 1-2, and generate the data frame 2 by receiving both the data frames 2-1 and 2-2.

Note that the instruction to transmit the data frame 1-2 and the data frame 2-2 is included in the trigger frame 2.

As described above, the wireless communication apparatus 100 can transmit the new data frame to the wireless terminal 300 by performing cooperative transmission with the wireless communication apparatus 200. Further, the wireless communication apparatus 100 can transmit the divided data frames to the wireless terminal 300 by performing cooperative transmission with the wireless communication apparatus 200.

The present embodiment and the modifications thereof have been described above. The present embodiment and the modifications thereof may be implemented and executed in combination. The wireless communication apparatus 100 of the present embodiment shares the data frames 1 to n with the wireless communication apparatus 200 and transmits the data frames 1 to n to the wireless terminal 300 at once. The wireless communication apparatus 100 determines the data frame received/not received by the wireless communication apparatus 200 and the wireless terminal 300, based on the information about the acknowledgement frame from the transmission destination. Based on the data frame received/not received by the wireless communication apparatus 200 and the wireless terminal 300, the wireless communication apparatus 100 determines whether the data frame needs to be retransmitted and whether the cooperative transmission with the wireless communication apparatus 200 is required when the data frame is retransmitted. Therefore, the time required for the wireless terminal 300 to receive the data frame can be reduced. Further, since the data frame for cooperative transmission is determined, the occupied time of the frequency band used for transmission in cooperative transmission can be reduced and the reception process of the wireless terminal 300 for cooperative transmission can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
   transmitter circuitry configured to transmit a first component including data frames to a first wireless communication apparatus and a second wireless communication apparatus;
   receiver circuitry configured to receive a first acknowledgement frame for the data frames from the first wireless communication apparatus and a second acknowledgement frame for the data frames from the second wireless communication apparatus; and
   processing circuitry configured to:
      determine, based on the first acknowledgement frame and the second acknowledgement frame, (i) a first data frame received by the first wireless communication apparatus and not received by the second wireless communication apparatus among the data frames, and (ii) a second data frame not received by the first wireless communication apparatus and the second wireless communication apparatus among the data frames, and
      determine (i) that the transmitter circuitry transmits the first data frame in cooperation with the first wireless communication apparatus to the second wireless communication apparatus, and (ii) that the transmitter circuitry transmits the second data frame to the second wireless communication apparatus without cooperative transmission with the first wireless communication apparatus.

2. The wireless communication apparatus of claim 1, wherein:
   the processing circuitry is configured to generate an instruction frame including an instruction for the first wireless communication apparatus to transmit the first data frame to the second wireless communication apparatus, and
   the transmitter circuitry is configured to transmit the instruction frame to the first wireless communication apparatus.

3. The wireless communication apparatus of claim 2, wherein the instruction frame includes an instruction to transmit the first data frame after a waiting time has elapsed from the end of the instruction frame.

4. The wireless communication apparatus of claim 3, wherein the transmitter circuitry is configured to transmit the second data frame to the second wireless communication apparatus after transmitting the instruction frame to the first wireless communication apparatus.

5. The wireless communication apparatus of claim 1, wherein when the transmitter circuitry transmits the first data frame in cooperation with the first wireless communication apparatus to the second wireless communication apparatus, a first time period in which the transmitter circuitry transmits at least one of the first data frame and the second data frame to the second wireless communication apparatus and a second time period in which the first wireless communication apparatus transmits the first data frame to the second wireless communication apparatus at least partially overlap each other.

6. The wireless communication apparatus of claim 1, wherein when the transmitter circuitry transmits the first data frame in cooperation with the first wireless communication apparatus to the second wireless communication apparatus, a first time period in which the transmitter circuitry transmits at least one of the first data frame and the second data frame to the second wireless communication apparatus and a second time period in which the first wireless communication apparatus transmits the first data frame to the second wireless communication apparatus are aligned with a waiting time.

7. The wireless communication apparatus of claim 1, wherein the transmitter circuitry is configured to transmit the first data frame by using OFDMA or MU-MIMO.

8. The wireless communication apparatus of claim 1, wherein:

the first acknowledgement frame is at least one of whether the receiver circuitry has received the first acknowledgement frame, and acknowledgement information of the data frame from the first wireless communication apparatus included in the first acknowledgement frame, and the second acknowledgement frame is at least one of whether the receiver circuitry has received the second acknowledgement frame, and acknowledgement information of the data frame from the second wireless communication apparatus included in the second acknowledgement frame.

9. The wireless communication apparatus of claim 1, wherein the processing circuitry is configured to not retransmit, based on the first acknowledgement frame and the second acknowledgement frame, the data frame in the first component received by the second wireless communication apparatus among the data frames.

10. The wireless communication apparatus of claim 1, wherein a third time period in which the transmitter circuitry transmits the first component to the first wireless communication apparatus and a fourth time period in which the transmitter circuitry transmits the first component to the second wireless communication apparatus at least partially overlap each other.

11. The wireless communication apparatus of claim 1, wherein the first component includes an instruction to hold the data frames included in the first component, regardless of a destination of the data frames.

12. The wireless communication apparatus of claim 1, wherein:
a plurality of the first wireless communication apparatuses are provided,
the first data frame is a data frame in the first component received by at least one of the first wireless communication apparatuses and not received by the second wireless communication apparatus among the data frames, and
a wireless communication apparatus that receives the first data frame among the first wireless communication apparatuses transmits the first data frame to the second wireless communication apparatus.

13. A wireless communication system, comprising:
the wireless communication apparatus of claim 1,
the first wireless communication apparatus; and
the second wireless communication apparatus.

14. A wireless communication apparatus comprising:
receiver circuitry configured to:
receive a first component including data frames from a first wireless communication apparatus, and
receive, from the first wireless communication apparatus, an instruction frame including an instruction to transmit a first data frame in the first component to a second wireless communication apparatus;
transmitter circuitry configured to transmit the first data frame to the second wireless communication apparatus;
a memory configured to hold at least a data frame or data included in the first component; and
processing circuitry,
wherein:
the receiver circuitry receives a second component including at least one data frame after receiving the first component,
the processing circuitry deletes at least a part of the data frame or data included in the first component based on information included in the second component,
the second component and the instruction frame include a deletion instruction to delete at least a part of the data frame or data included the first component received by the receiver circuitry, and
the processing circuitry deletes at least a part of the data frame or the data included in the first component held in the memory, based on the deletion instruction.

15. The wireless communication apparatus of claim 14, wherein a first time period in which the transmitter circuitry transmits the first data frame to the second wireless communication apparatus and a second time period in which the first wireless communication apparatus transmits the first data frame to the second wireless communication apparatus at least partially overlap each other.

16. The wireless communication apparatus of claim 14, wherein the first component includes an instruction to hold the data frames, regardless of a destination of the data frames.

17. A method comprising:
transmitting a first component including data frames to a first wireless communication apparatus and a second wireless communication apparatus;
receiving a first acknowledgement frame for the data frames from the first wireless communication apparatus and a second acknowledgement frame for the data frames from the second wireless communication apparatus;
determining, based on the first acknowledgement frame and the second acknowledgement frame, (i) a first data frame received by the first wireless communication apparatus and not received by the second wireless communication apparatus among the data frames, and (ii) a second data frame not received by the first wireless communication apparatus and the second wireless communication apparatus among the data frames; and
determining (i) that the first data frame is transmitted to the second wireless communication apparatus in cooperation with the first wireless communication apparatus, and (ii) that the second data frame is transmitted to the second wireless communication apparatus without cooperative transmission with the first wireless communication apparatus.

18. A method comprising:
receiving a first component including data frames from a first wireless communication apparatus;
receiving, from the first wireless communication apparatus, an instruction frame including an instruction to transmit a first data frame in the first component to a second wireless communication apparatus;
transmitting the first data frame to the second wireless communication apparatus;
holding at least a data frame or data included in the first component in a memory;
receiving a second component including at least one data frame after receiving the first component; and
deleting at least a part of the data frame or data included in the first component based on information included in the second component,
wherein:
the second component and the instruction frame include a deletion instruction to delete at least a part of the data frame or data included in the first component received from the first wireless communication apparatus, and the deleting comprises deleting at least a part of the data frame or the data included in the first component held in the memory, based on the deletion instruction.

\* \* \* \* \*